United States Patent
Lee et al.

(10) Patent No.: US 11,483,733 B2
(45) Date of Patent: Oct. 25, 2022

(54) TRANSPORTING A MULTI-TRANSPORT NETWORK CONTEXT-IDENTIFIER (MTNC-ID) ACROSS MULTIPLE DOMAINS

(71) Applicant: Huawei Technologies Co., Ltd., Shenzhen (CN)

(72) Inventors: Young Lee, Plano, TX (US); James Neil Guichard, Hollis, NH (US); Kaippallimalil Mathew John, Carrollton, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/840,113

(22) Filed: Apr. 3, 2020

(65) Prior Publication Data
US 2021/0037410 A1 Feb. 4, 2021

Related U.S. Application Data

(63) Continuation of application No. PCT/US2019/044427, filed on Jul. 31, 2019.

(51) Int. Cl.
*H04W 28/02* (2009.01)
*H04L 12/741* (2013.01)
*H04L 45/745* (2022.01)

(52) U.S. Cl.
CPC ....... *H04W 28/0268* (2013.01); *H04L 45/745* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 10,567,245 B1* | 2/2020 | Patil | H04W 24/08 |
| 10,715,419 B1* | 7/2020 | Suryanarayana | H04L 45/507 |
| 2006/0153111 A1* | 7/2006 | Roh | H04W 40/00 370/310 |
| 2013/0054761 A1 | 2/2013 | Kempf et al. | |
| 2013/0322451 A1 | 12/2013 | Wang et al. | |
| 2015/0256456 A1 | 10/2015 | Previdi et al. | |

(Continued)

OTHER PUBLICATIONS

Lee, Y., et al., "Extended ACTN Architecture to Enable End-To-End 5G Transport Service Assurance," 21st International Conference on Transparent Optical Networks, Jul. 9, 2019, XP033618028, 3 pages.

(Continued)

*Primary Examiner* — Eunsook Choi
(74) *Attorney, Agent, or Firm* — Conley Rose, P.C.

(57) ABSTRACT

A method performed by a Next Generation Node B (gNB) in a communications system implementing User Datagram Protocol (UDP) comprises indicating that a data packet comprises a multi-transport network context-identifier (MTNC-ID) corresponding to a forwarding path and being associated with a set of resource provisioning requirements for one or more transport networks on the forwarding path to provision transport resources for traffic forwarding on the forwarding path, inserting the MTNC-ID into a Generic UDP Encapsulation (GUE) header of the data packet, and transmitting the data packet to a network element (NE) in the communications system based on the forwarding path corresponding to the MTNC-ID.

26 Claims, 15 Drawing Sheets

(56) References Cited

U.S. PATENT DOCUMENTS

| | | | |
|---|---|---|---|
| 2016/0182400 A1 | 6/2016 | Ceccarelli et al. | |
| 2016/0212050 A1* | 7/2016 | Yin | H04L 45/08 |
| 2017/0019331 A1* | 1/2017 | Yong | H04L 45/64 |
| 2017/0063783 A1* | 3/2017 | Yong | H04L 67/2814 |
| 2018/0241671 A1* | 8/2018 | Bosch | H04L 45/16 |
| 2019/0104111 A1* | 4/2019 | Cidon | H04L 61/25 |
| 2020/0145876 A1* | 5/2020 | Dao | H04W 28/0268 |
| 2020/0329008 A1* | 10/2020 | Dao | G06F 16/953 |
| 2021/0099382 A1* | 4/2021 | Liu | H04W 24/08 |

OTHER PUBLICATIONS

3rd Generation Partnership Project; Technical Specification Group Core Network and Terminals; Study on User Plane Protocol in 5GC (Release 16), Technical Report, 3GPP TR 29.892, V1.0.0, Mar. 2019, 37 pages.
Previdi, S. Ed., et al., "IPv6 Segment Routing Header (SRH)," draft-ietf-6man-segment-routing-header-06, Sep. 14, 2017, 35 pages.
Bashandy, A., Ed., et al., "IS-IS Extensions to Support Segment Routing over IPv6 Dataplane," draft-bashandy-isis-srv6-extensions-00, Mar. 10, 2017, 16 pages.
Matsushima, S., et al., "Segment Routing IPv6 for Mobile User-Plane," draft-matsushima-spring-dmm-srv-mobile-uplane-03, Nov. 12, 2017, 20 pages.
"Internet Protocol Darpa Internet Program Protocol Specification," Sep. 1981, RFC 791, 51 pages.
Deering, et al., "Internet Protocol, Version 6 (IPv6) Specification," RFC 8200, 42 pages.
Postel, "User Datagram Protocol," RFC 768, 3 pages.
Herbert, et al., "Generic UDP Encapsulation," draft-ietf-intarea-gue-07, Mar. 7, 2019, 155 pages.

* cited by examiner

1600

1700

TRANSPORTING A MULTI-TRANSPORT NETWORK CONTEXT-IDENTIFIER (MTNC-ID) ACROSS MULTIPLE DOMAINS

CROSS-REFERENCE TO RELATED APPLICATIONS

This application is a continuation of International Application No. PCT/US2019/044427 filed on Jul. 31, 2019 by Young Lee, et al., and entitled "Transporting a Multi-Transport Network Context Identifier (MTNC-ID) Across Multiple Domains," which is related to International Application No. PCT/US2019/044422 filed on Jul. 31, 2019 by Young Lee, et al. and entitled "Transporting MTNC-ID over SRV6-Header for 5G Transport," and International Application No. PCT/US2019/044416 filed on Jul. 31, 2019 by Young Lee, et al. and entitled "Transporting MTNC-ID over SRV6-Enabled Dataplane for 5g Transport," all three of which are hereby incorporated by reference in their entireties.

FIELD OF INVENTION

The present disclosure relates generally to wireless communications, and, in particular embodiments, to a method and apparatus of providing a transport context in the form of a multi-transport network context identifier (MNTC-ID) across multiple domains using a user datagram protocol (UDP) header.

BACKGROUND

Traffic engineered (TE) mobile network backhauls use provisioning based on, more or less, static engineering estimates. These estimates may be changed, and traffic engineering may be configured periodically based on demand and other performance criteria. However, such a traffic engineering process may take a long time (e.g., on the order of weeks or months), and thus may not be suitable for networks having dynamically changing contexts, such as the fifth generation (5G) mobile networks. It is desirable to provide dynamically traffic engineered paths in backhaul networks to meet the need of changing traffic demands.

SUMMARY

A first aspect of the present disclosure relates to a method performed by a Next Generation Node B (gNB) in a communications system implementing User Datagram Protocol (UDP). The method comprises indicating that a data packet comprises a multi-transport network context-identifier (MTNC-ID) corresponding to a forwarding path and being associated with a set of resource provisioning requirements for one or more transport networks on the forwarding path to provision transport resources for traffic forwarding on the forwarding path, inserting the MTNC-ID into a Generic UDP Encapsulation (GUE) header of the data packet, and transmitting the data packet to a network element (NE) in the communications system based on the forwarding path corresponding to the MTNC-ID.

Optionally, in a first implementation according to the first aspect, the set of resource provisioning requirements comprises a quality of service (QoS) requirement, a class of service (CoS) requirement, a resilience requirement, and an isolation requirement.

Optionally, in a second implementation according to the first aspect or implementation of the first aspect, each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

Optionally, in a third implementation according to the first aspect or implementation of the first aspect, the method further comprises storing a forwarding table comprising a mapping between the MTNC-ID and the forwarding path.

Optionally, in a fourth implementation according to the first aspect or implementation of the first aspect, the method further comprises encapsulating the data packet to include a UDP header and the GUE header, wherein the GUE header comprises a "C" flag field, an "M" flag field, and an MTNC-ID field, wherein the "C" flag field is set to indicate that the data packet carries a data message, wherein the "M" flag field indicates that the data packet comprises the MTNC-ID, and wherein the MTNC-ID field carries the MTNC-ID.

Optionally, in a fifth implementation according to the first aspect or implementation of the first aspect, the method further comprises encapsulating the data packet to include a UDP header and the GUE header, wherein the GUE header comprises a "C" flag field, a proto/ctype field, and an MTNC-ID field, wherein the "C" flag field is set to indicate that the data packet carries a control message, wherein the proto/ctype comprises a value indicating that the data packet comprises the MTNC-ID, and wherein the MTNC-ID field carries the MTNC-ID.

Optionally, in a sixth implementation according to the first aspect or implementation of the first aspect, the method further comprises encapsulating the data packet to further comprise an outer Internet Protocol (IP) header, a UDP extension header, a General Packet Radio Service Tunneling Protocol (GTP)-User Data Tunneling (GTP-U) header, and an inner IP header, wherein the UDP extension header comprises a UDP header and the GUE header carrying the MTNC-ID.

A second aspect of the present disclosure relates to a method performed by a network element (NE) in a communications system implementing User Datagram Protocol (UDP). The method comprises receiving a data packet carrying a multi-transport network context-identifier (MTNC-ID) in a Generic UDP Encapsulation (GUE) header of the data packet from a previous NE in the communications system, the MTNC-ID corresponding to a forwarding path and being associated with a set of resource provisioning requirements for one or more transport networks on the forwarding path to provision transport resources for traffic forwarding on the forwarding path, obtaining the forwarding path corresponding to the MTNC-ID from a local forwarding table, and transmitting the data packet to a next NE in the communications system based on the forwarding path corresponding to the MTNC-ID.

Optionally, in a first implementation according to the second aspect, the set of resource provisioning requirements comprises a quality of service (QoS) requirement, a class of service (CoS) requirement, a resilience requirement, and an isolation requirement.

Optionally, in a second implementation according to the second aspect or implementation of the second aspect, each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

Optionally, in a third implementation according to the second aspect or implementation of the second aspect, the data packet comprises a UDP header and the GUE header, wherein the GUE header comprises a "C" flag field, an "M" flag field, and an MTNC-ID field, wherein the "C" flag field is set to indicate that the data packet carries a data message, wherein the "M" flag field indicates that the data packet comprises the MTNC-ID, and wherein the MTNC-ID field carries the MTNC-ID.

Optionally, in a fourth implementation according to the second aspect or implementation of the second aspect, the data packet comprises a UDP header and the GUE header, wherein the GUE header comprises a "C" flag field, a proto/ctype field, and an MTNC-ID field, wherein the "C" flag field is set to indicate that the data packet carries a control message, wherein the proto/ctype comprises a value indicating that the data packet comprises the MTNC-ID, and wherein the MTNC-ID field carries the MTNC-ID.

Optionally, in a fifth implementation according to the second aspect or implementation of the second aspect, the data packet comprises an outer Internet Protocol (IP) header, a UDP extension header, a General Packet Radio Service Tunneling Protocol (GTP)-User Data Tunneling (GTP-U) header, and an inner IP header, wherein the UDP extension header comprises a UDP header and the GUE header carrying the MTNC-ID.

A third aspect of the present disclosure relates to a Next Generation Node B (gNB) implemented in a communications system, comprising a memory configured to store instructions, and a processor coupled to the memory and configured to execute the instructions, which cause the processor to be configured to indicate that a data packet comprises a multi-transport network context-identifier (MTNC-ID) corresponding to a forwarding path and being associated with a set of resource provisioning requirements for one or more transport networks on the forwarding path to provision transport resources for traffic forwarding on the forwarding path, insert the MTNC-ID into a Generic User Datagram Protocol (UDP) Encapsulation (GUE) header of the data packet, and transmit the data packet to a network element (NE) in the communications system based on the forwarding path corresponding to the MTNC-ID.

Optionally, in a first implementation according to the third aspect, the set of resource provisioning requirements comprises a quality of service (QoS) requirement, a class of service (CoS) requirement, a resilience requirement, and an isolation requirement.

Optionally, in a second implementation according to the third aspect or implementation of the third aspect, each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

Optionally, in a third implementation according to the third aspect or implementation of the third aspect, the instructions further cause the processor to be configured to store a forwarding table comprising a mapping between the MTNC-ID and the forwarding path.

Optionally, in a fourth implementation according to the third aspect or implementation of the third aspect, the instructions further cause the processor to be configured to encapsulate the data packet to include a UDP header and the GUE header, wherein the GUE header comprises a "C" flag field, an "M" flag field, and an MTNC-ID field, wherein the "C" flag field is set to indicate that the data packet carries a data message, wherein the "M" flag field indicates that the data packet comprises the MTNC-ID, and wherein the MTNC-ID field carries the MTNC-ID.

Optionally, in a fifth implementation according to the third aspect or implementation of the third aspect, the instructions further cause the processor to be configured to encapsulate the data packet to include a UDP header and the GUE header, wherein the GUE header comprises a "C" flag field, a proto/ctype field, and an MTNC-ID field, wherein the "C" flag field is set to indicate that the data packet carries a control message, wherein the proto/ctype comprises a value indicating that the data packet comprises the MTNC-ID, and wherein the MTNC-ID field carries the MTNC-ID.

Optionally, in a sixth implementation according to the third aspect or implementation of the third aspect, the instructions further cause the processor to be configured to encapsulate the data packet to further comprise an outer Internet Protocol (IP) header, a UDP extension header, a General Packet Radio Service Tunneling Protocol (GTP)-User Data Tunneling (GTP-U) header, and an inner IP header, wherein the UDP extension header comprises a UDP header and the GUE header carrying the MTNC-ID.

A fourth aspect of the present disclosure relates to a network element (NE) implemented in a communications system, comprising a memory configured to store instructions, and a processor coupled to the memory and configured to execute the instructions, which cause the processor to be configured to receive a data packet carrying a multi-transport network context-identifier (MTNC-ID) in a Generic User Datagram Protocol (UDP) Encapsulation (GUE) header of the data packet from a previous NE in the communications system, the MTNC-ID corresponding to a forwarding path and being associated with a set of resource provisioning requirements for one or more transport networks on the forwarding path to provision transport resources for traffic forwarding on the forwarding path, obtain the forwarding path corresponding to the MTNC-ID from a local forwarding table, and transmit the data packet to a next NE in the communications system based on the forwarding path corresponding to the MTNC-ID.

Optionally, in a first implementation according to the fourth aspect, the set of resource provisioning requirements comprises a quality of service (QoS) requirement, a class of service (CoS) requirement, a resilience requirement, and an isolation requirement.

Optionally, in a second implementation according to the fourth aspect or implementation of the fourth aspect, each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

Optionally, in a third implementation according to the fourth aspect or implementation of the fourth aspect, the data packet comprises a UDP header and the GUE header, wherein the GUE header comprises a "C" flag field, an "M" flag field, and an MTNC-ID field, wherein the "C" flag field is set to indicate that the data packet carries a data message, wherein the "M" flag field indicates that the data packet comprises the MTNC-ID, and wherein the MTNC-ID field carries the MTNC-ID.

Optionally, in a fourth implementation according to the fourth aspect or implementation of the fourth aspect, the data packet comprises a UDP header and the GUE header, wherein the GUE header comprises a "C" flag field, a proto/ctype field, and an MTNC-ID field, wherein the "C" flag field is set to indicate that the data packet carries a control message, wherein the proto/ctype comprises a value indicating that the data packet comprises the MTNC-ID, and wherein the MTNC-ID field carries the MTNC-ID.

Optionally, in a fifth implementation according to the fourth aspect or implementation of the fourth aspect, the data packet comprises an outer Internet Protocol (IP) header, a UDP extension header, a General Packet Radio Service Tunneling Protocol (GTP)-User Data Tunneling (GTP-U) header, and an inner IP header, wherein the UDP extension header comprises a UDP header and the GUE header carrying the MTNC-ID.

A fifth aspect of the present disclosure relates to an apparatus comprising a means for indicating that a data packet comprises a multi-transport network context-identifier (MTNC-ID) corresponding to a forwarding path and being associated with a set of resource provisioning requirements for one or more transport networks on the forwarding path to provision transport resources for traffic forwarding on the forwarding path, a means for inserting the MTNC-ID into a Generic User Datagram Protocol (UDP) Encapsulation (GUE) header of the data packet, and a means for transmitting the data packet to a network element (NE) in a communications system based on the forwarding path corresponding to the MTNC-ID.

A sixth aspect of the present disclosure relates to an apparatus comprising a means for receiving a data packet carrying a multi-transport network context-identifier (MTNC-ID) in a Generic UDP Encapsulation (GUE) header of the data packet from a previous network element (NE) in a communications system, the MTNC-ID corresponding to a forwarding path and being associated with a set of resource provisioning requirements for one or more transport networks on the forwarding path to provision transport resources for traffic forwarding on the forwarding path, a means for obtaining the forwarding path corresponding to the MTNC-ID from a local forwarding table, and a means for transmitting the data packet to a next NE on the forwarding path based on the MTNC-ID.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Network services requested by users are often associated with requirements, e.g., quality of service (QoS) requirements, which need to be met so that the users may receive levels of services as contracted. Transport networks that are configured to provide transport services also need to provision transport resources according to these requirements for forwarding traffic.

The present disclosure provides various embodiments for enabling an SRV6 data plane to carry an MTNC-ID (which is a type of metadata). The MTNC-ID is processed for each domain to route data packets using a pre-established path in each domain that corresponds to the MTNC-ID. The MTNC-ID represents a combination of QoS requirements, a class of service (CoS) requirement, a resilience requirement, and/or an isolation requirement according to which transport resources of a transport network are provisioned for routing traffic between two service end points.

The User Plane Function (UPF) is a fundamental component of a 3GPP 5G core infrastructure system architecture. The UPF provides the interconnect point between the mobile infrastructure and the Data Network (DN), (i.e., encapsulation and decapsulation of General Packet Radio Services (GPRS) Tunneling Protocol for the User Plane (GTP-U)); the Protocol Data Unit (PDU) session anchor point for providing mobility within and between Radio Access Technologies (RATs), including sending one or more end marker packets to the gNB; packet routing and forwarding; application detection; per-flow QoS handling; and traffic usage reporting. As will be described herein, the UPF has four distinct reference points: (1) N3: Interface between the radio access network RAN (e.g., one or more base stations) and the (initial) UPF; (2) N9: Interface between two UPF's (i.e., the Intermediate I-UPF and the UPF Session Anchor); (3) N6: Interface between the data network (DN) and the UPF; and (4) N4: Interface between the session management function (SMF) and the UPF. The disclosed embodiments are applicable if any of N3, N9, or N6 is a SRV6-enabled network. Additional benefits of the disclosed embodiments can be ascertained from the following description.

Figure 1:
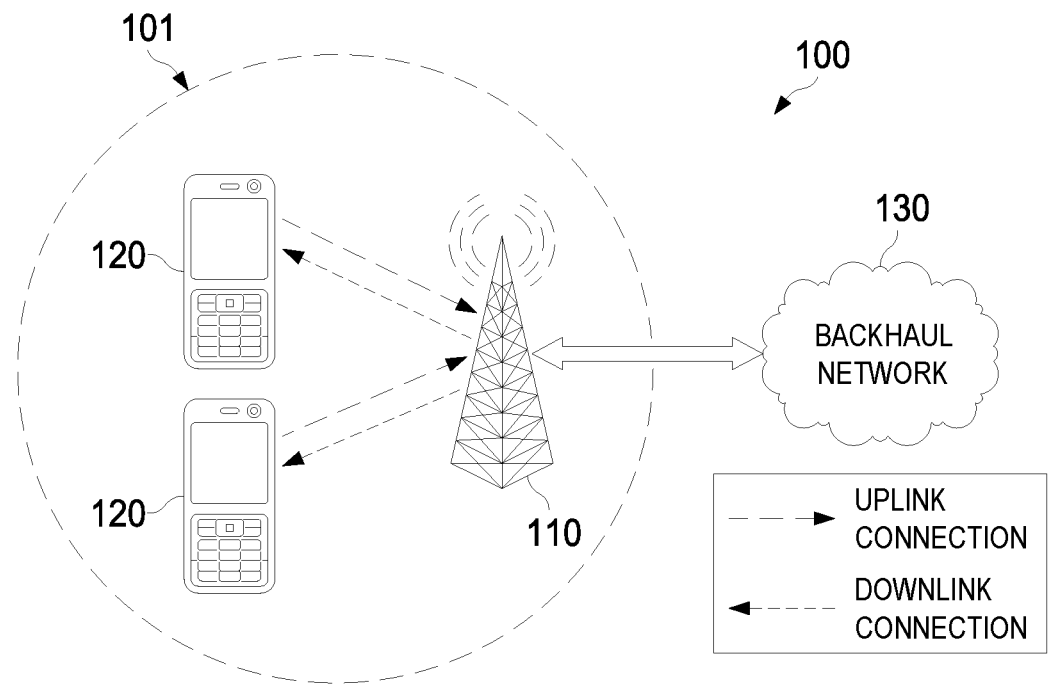
FIG. 1 is a diagram illustrating an embodiment of a wireless communications network.

FIG. 1 is a diagram illustrating an embodiment of a wireless communications network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a next generation gigabit NodeB (gNB), a transmit/receive point (TRP), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
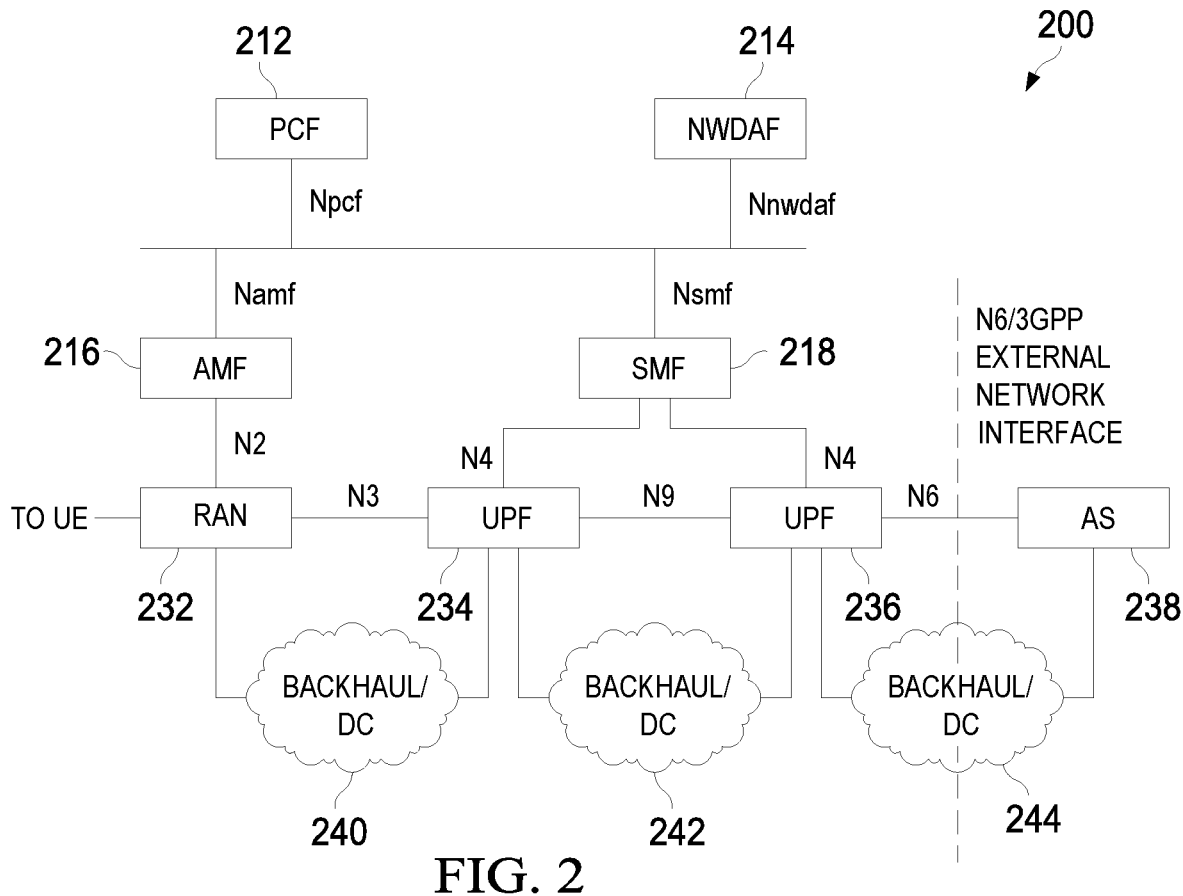
FIG. 2 is a diagram illustrating Third Generation Partnership Project (3GPP) control plane functions for setting up user plane connections in the wireless communications network.

FIG. 2 is a diagram 200 illustrating Third Generation Partnership Project (3GPP) control plane functions for setting up user plane connections in the wireless communications network 100 of FIG. 1. Specifically, FIG. 2 illustrates 3GPP control plane functions (e.g., an access and mobility management function (AMF), an SMF, etc.) that provide access and session handling capabilities for setting up user plane connections across a segment N3 (e.g., a communication segment between a radio access network (RAN) and a user plane Function (UPF) (also referred to as an interface N3)), across a segment N9 (e.g., a segment between UPFs (also referred to as an interface N9)), and across a segment N6 (e.g., a segment between a UPF and an edge network and/or other external destinations (also referred to as an interface N9)).

The control plane functions shown in FIG. 2 include a policy control function (PCF) 212, a network data analysis function (NWDAF) 214, an AMF 216, and a SMF 218. 3GPP specifications, including Technical Specification (TS) 23.501 and TS 23.502, describe these control plane and user plane functions in detail. For example, the SMF 218 is responsible for handling individual user sessions, in particular, Internet Protocol (IP) addresses, routing, and mobility. The SMF 218 provisions user sessions subject to network and subscription policy as defined in the PCF 212. The NWDAF 214 is responsible for network data analysis, i.e., analysis on data from various 3GPP network functions (NFs). The AMF 216 is responsible for handling connection and mobility management.

Each of the control plane functions communicate with other functions through their specific interfaces. For example, the PCF 212 communicates via an interface Npcf, the NWDAF 214 communicates via an interface Nnwdaf, the AMF 216 communicates via an interface Namf, and the SMF 218 communicates via an interface Nsmf.

In the data plane, UEs may access a RAN 232 for wireless communication, and traffic may be routed between the RAN 232 and a UPF 234 via N3, between the UPF 234 and a UPF 236 via N9, and between the UPF 236 and an application server (AS) 238 via N6. In some cases, the interface between the UPF 236 and the AS 238 may be N6 or a 3GPP external network interface.

The end-to-end connections for N3, N9, and N6 may traverse a backhaul network or a data center (DC) network 240, 242, 244. For example, the connection over N3 traverses a backhaul/DC network 240, the connection over N9 traverses backhaul/DC network 242, and the connection over N6 traverses a backhaul/DC network 244. Each of the backhaul or DC networks may be referred to as a transport network or a domain, and traffic is routed or transported through a transport network corresponding to an interface N3, N6, or N9. The corresponding transport underlay for these interfaces N3, N6, and N9 may need to be traffic engineered to support various 5G use cases. For example, to satisfy requirements such as low latency, and high reliability for data flows, as well as the ability to support dynamically varying demands on network capacity, software defined network (SDN)-controllers (SDN-Cs) in the transport domain may need to get requests from a 3GPP system and provide the path capabilities requested.

Mobile network backhauls use static configuration and provisioning of routers for traffic engineering (TE), where TE is configured periodically (e.g., weekly or monthly) based on demand and other performance criteria. The backhauls provide statically traffic engineered paths for forwarding traffic. However, in 5G systems with a large range of services, low latency paths, and mobility, the demand estimate varies much more dynamically (e.g., in the order of several minutes in the worst cases). To support and provide dynamically traffic engineered paths (e.g., forwarding paths) that accommodate dynamically varying traffic demand, as well as other requirements, MTNC-IDs are associated and applied to data packets in the control plane based on which transport networks provide contract bound services according to the transport network context or the transport context identified by the MTNC-IDs. The terms "transport network context" and "transport context" are used interchangeably throughout the disclosure. Each MTNC-ID may correspond to one forwarding path between two data plane network functions, e.g., UPFs 234 and 236. The forwarding path may include one or more transport networks configured for forwarding traffic on the forwarding path. In one embodiment, the transport network context identified by an MTNC-ID corresponding to a forwarding path may include a set of requirements, such as quality of service QoS requirements, CoS requirements, a resilience requirement, and/or an isolation requirement, according to which transport resources of each transport network on the forwarding path are provisioned for routing traffic on the forwarding path.

In some cases, traffic is transmitted over an end-to-end transmission path from a source network (or a source site) to a destination network (or a destination site). The source network and the destination network are referred to as customer networks (at different sites). In one example, a customer network may be a mobile network, or an edge computing network. In another example, one of the source network and the destination network is a radio access network, and the other one is a mobile core. The following embodiments use 3GPP mobile networks as examples for merely illustrative purposes. Other networks may also be applicable, such as a content delivery network (CDN) or a DC network, without departing from the principle and spirit of the present disclosure.

Communication of traffic between the customer networks (or two sites) may be through one or more backhaul networks or DCs 240, 242, and 244. Thus, traffic is routed from the source network to the destination network through the one or more backhaul networks or DCs. The backhaul networks or DCs for routing traffic between two customer networks may be referred to as transport networks. Traffic communicated between the customer networks through a transport network may also be referred to as being communicated across different domains (or across different sites). The source network, destination network, and the transport network may be viewed as being associated with different domains. In an illustrative example, where the two customer networks may be two different 3GPP mobile networks, the 3GPP mobile networks are associated with 3GPP domains, and the transport network is associated with a transport domain. Thus, in this example, traffic is communicated across 3GPP domains and a transport domain. The mobile networks may also be viewed as being associated with application domains.

Network slicing divides a network service into many parallel network slice instances and distributes functions of each slice instance as independent units based on network conditions and service requirements. Network slicing may allow multiple virtual networks to be created on top of a common shared physical infrastructure, and the virtual networks may then be customized to meet specific needs of applications, services, devices, customers, or operators. For example, in the case of 5G, a single physical network may be sliced into multiple virtual networks that may support different RANs, or different service types running across a single RAN.

A network slice may be associated with a set of resources of the network. For example, a 3GPP slice may be associated with a set of 3GPP network resources. A transport slice may be associated with a set of transport network resources. A transport network slice may correspond to QoS, CoS, resilience and isolation requirements. There may be multiple slice instances corresponding to a slice, and they may be dedicated or shared. In this way, an MTNC-ID may also be associated with a network slice.

Figure 3:
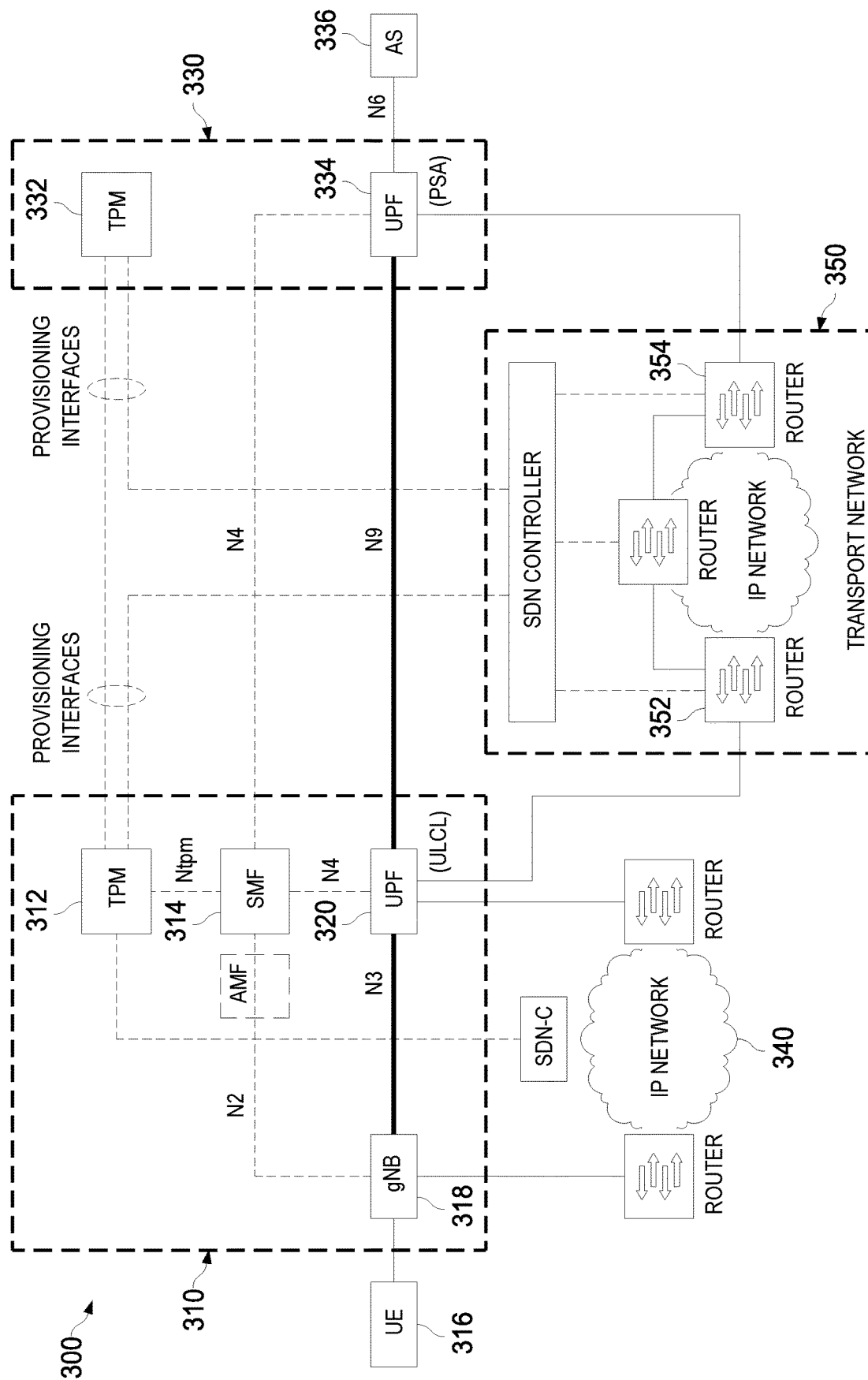
FIG. 3 is a diagram illustrating an embodiment of a communications system highlighting transport networks used for forwarding traffic between mobile networks.

FIG. 3 is a diagram illustrating an embodiment of a communications system 300 highlighting transport networks used for forwarding traffic between a mobile network 310 and a mobile network 330 using MTNC-IDs. FIG. 3 shows that MTNC-IDs are shared by the different transport networks in the communications system 300 (e.g., the application (i.e., mobile network) domain and the transport domain).

In FIG. 3, mobile network functions are deployed across two sites (i.e., the mobile networks 310 and 330, (referred to as Site 1, Site 2, respectively), and a transport network 350 in between. As shown, the mobile network 310 includes a transport path manager (TPM) 312, and a SMF 314. The mobile network 330 includes a TPM 332. A UE 316 communicates with a gNB 318 in the mobile network 310. Traffic may be transmitted from the gNB 318 to a UPF 320 of the mobile network 310, routed by the transport network 350 on a path including PE routers 352 and 354, forwarded to a UPF 334 of the mobile network 330, and then delivered to an application server (AS) 336. Communications between the UE 316 and the gNB 318 traverse a radio network. Communications between the gNB 318 and the UPF 320 is through the interface N3 traversing a transport network 340 (which is an IP network). Communications between the UPF 320 and the UPF 334 is through the interface N9 traversing a backhaul network (or a transport network) 350. Communication between the UPF 334 and the AS 336 is through the interface N6 that may traverse another data center (or a transport network). Each transport network includes an SDN-C provisioning and managing router. The path for communicating traffic between the UE 316 and the AS 336 may thus include multiple segments, i.e., a N3 segment, a N9 segment, and a N6 segment.

A TPM (e.g., TPM 312 or TPM 332) is a control function of a customer network, and one TPM is configured per customer network (or site). A TPM of a network (e.g., a mobile network) may be configured to collect data, e.g., user session information, traffic volume, etc., regarding traffic demand of the network, collect topology information of a transport network that is used to forward traffic between the network and other networks, negotiate with a TPM of another network for traffic matrix, and collect performance data regarding transport paths of a transport network for routing traffic between the network and other networks through the transport network. The TPM may be configured to dynamically determine whether to request to configure a transport path in a transport network for routing traffic from the network to another network through the transport network, based on the collected data, estimates and/or requirements, such as QoS determined, demands estimated, traffic matrix negotiated, PE routers of the transport network that are determined, and one or more transport path configuration constraints.

For example, 3GPP TS 23.501 or 5G supports a number of service level guarantees for QoS, such as ultra-low latency, ultra-high reliability, and latency determinism to best effort. 3GPP UPFs classify and allocate resources for packet data network (PDN) connections and flows according to QoS levels and slice information. In the transport networks, resources are granted based on the service level guarantees by the mobile network.

In FIG. 3, the N3 segment between the gNB 318 and the UPF 320 is over the transport network 340 at Site 1, which may be a data center or a center office (DC/CO). In the N9 segment, in the case as shown in FIG. 3, there are three transport segments (or paths), a transport segment at each mobile network site (Site 1 and Site 2), a transport segment from the UPF 320 to the router 352 of the transport network 350, a transport segment from the router 354 to the UPF 334, and a transport (or backhaul) segment in between routers 352 and 354. In order for each transport network to provision transport resources and provide a service of an agreed level, each transport network may consider the estimation of traffic and provisioning by TPMs and SDN controllers across the service and transport domains, and the provisioning of MTNC-IDs shared by the application (the mobile network) domain and the transport domain, where the MTNC-IDs indicate different service levels and/or slice information. The MTNC-IDs may be per CoS in the transport domain(s) that corresponds to a data plane segment like N3 or N9.

Figure 4:
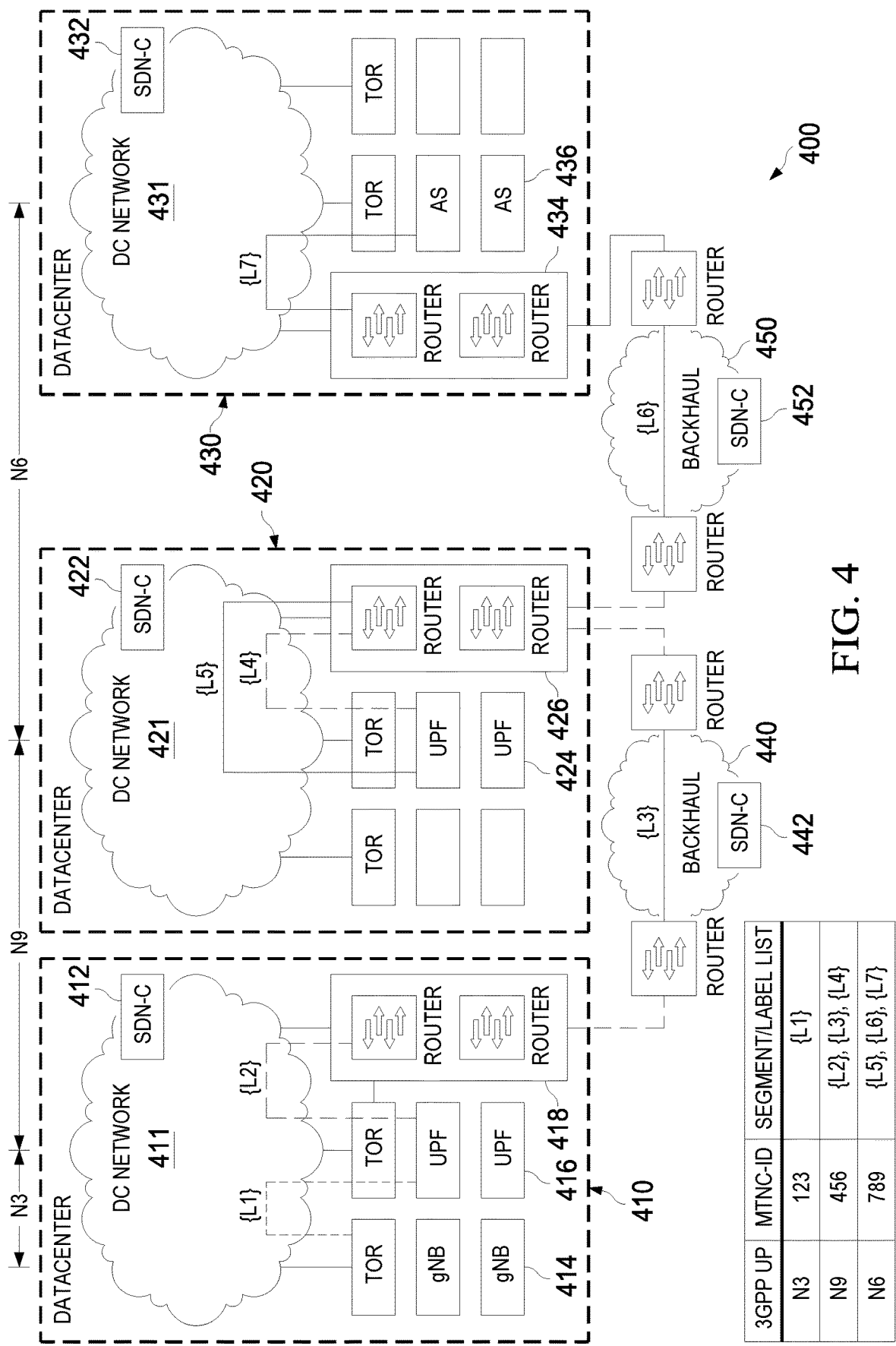
FIG. 4 is a diagram illustrating an embodiment of a communications system highlighting transport segments.

FIG. 4 is a diagram illustrating an embodiment of a communications system 400 highlighting transport segments. FIG. 4 shows the relationship between MTNC-IDs, 3GPP data plane segments, and transport segments. In FIG. 4, service layer user plane segments (e.g., N3, N9, N6 segments) are located in different data centers interconnected by backhaul and data center transports, and there may be multiple connection segments per 3GPP data plane segment. For example, the N9 user plane segment may use multiple transport segments across data centers and/or backhaul transports. The transport segments may be represented by a list of labels or segment numbers, e.g., {L1}, {L2}, {L7}.

As shown, the communications system 400 includes a data center 410, a data center 420, and a data center 430. Each of the data centers may correspond to a customer network. The data centers include routers routing traffic in or out of the respective data centers, top of rack (TOR) and/or end of row (EOR) switches. The data center 410 includes gNBs 414 providing access services. A DC network 411 is provided in the data center 410 for forwarding traffic within the data center 410. An SDN-C 412 is configured to provision and manage routing for the DC network 411. Within the data center 410, traffic may be transmitted by a gNB 414 to one of the UPFs 416 (i.e., segment {L1}), and forwarded from one of the UPFs 416 to one of the routers 418 (i.e., segment {L2}). Transport services for {L1} and {L2} are provided by the DC network (or transport network) 411 within the data center 410.

The data center 420 includes a DC network 421 for forwarding traffic within the data center 420. An SDN-C 422 is configured to provision and manage routing for the DC network 421. Within the data center 420, incoming traffic may be received and forwarded by one of the routers 426 to one of the UPFs 424 (i.e., segment {L4}), and outgoing traffic may be forwarded from one of the UPFs 424 to one of the routers 426 (i.e., segment {L5}). Transport services for {L4} and {L5} are provided by the DC network (or transport network) 421 within the data center 420.

The data center 430 includes a DC network 431 for forwarding traffic within the data center 430. An SDN-C 432 is configured to provision and manage routing for the DC network 431. Incoming traffic may be received by one of the routers 434 and forwarded to one of application servers (AS) 436 (i.e., segment {L7}). Transport services for {L7} are provided by the DC network (or transport network) 431 within the data center 430.

Traffic transmitted from the data center 410 to the data center 420 may be transported by a backhaul network 440, e.g., in a segment {L3}. An SDN-C 442 is configured to provision and manage routing for the backhaul network 440. Traffic transmitted from the data center 420 to the data center 430 may also be transported by a backhaul network 450, e.g., in a segment {L6}. An SDN-C 452 is configured to provision and manage routing for the backhaul network 450.

For traffic transmitted from the gNB 414 to an application server (AS) 436, the traffic may pass through transport segments {L1}, {L2}, ... {L7}. Services provided on each of the transport segments meet the requirements of a level of service of a corresponding user plane segment, e.g., N3 or N9.

In some embodiments, MTNC-IDs are provided to indicate or identify the requirements. As described above, an MTNC-ID identifies the MTNC or transport context for a user plane segment (e.g., N3 or N9), where transport resources of each transport segment along the user plane segment are provisioned according to the transport context. As discussed above, there may be one or more transport segments (consequently, one or more transport networks) corresponding to one user plane segment. For example, the N9 segment corresponds to transport segments {L2}, {L3}, and {L4}. Thus, all the transport segments {L2}, {L3}, and {L4} share one MTNC-ID of the corresponding user plane segment.

In the following, a user plane segment is referred to as a connection path between two service end points, i.e., two user plane network functions (e.g., between the gNB 414 and the UPF 416, between the UPFs 416 and 424, or between the UPF 424 and the AS 436). A connection path is established for a user session or a PDU session. For example, for transmitting traffic from the data center 410 to the data center 430, three connection paths are established, i.e., from the gNB 414 to the UPF 416, from the UPF 416 to the UPF 424, and from the UPF 424 to the AS 436. The connection path may exist for the duration of the user session. A connection path may include one or more transport segments. For example, the connection path from the gNB 414 to the UPF 416 includes transport segment {L1}. The connection path from the UPF 416 to the UPF 424 includes transport segments {L2}, {L3}, and {L4}. The connection path from the UPF 424 to the AS 436 includes transport segments {L5}, {L6}, and {L7}. A connection path may also be referred to as a forwarding path, a tunnel, or a connection segment in the following embodiments.

The MTNC or transport context identified by an MTNC-ID may include the requirements for a certain level of service. The requirements may include CoS requirements, a set of QoS requirements, such as a bandwidth, a latency, jitter, etc., a resilience requirement, such as a protection level (e.g., 1+1, 1+1+restoration, or shared protection, etc.), and/or an isolation requirement, such as hard isolation, soft isolation, or no isolation. Based on the requirements, a network slice (also referred to herein as a transport slice) may be generated to provide routing services. The network slice corresponds to resources provisioned/allocated according to the requirements associated with the MTNC-ID.

CoS requirements indicate a classification of services into categories so that traffic of the services is treated according to the classification. CoS may be associated with a set of QoS characteristics for a network slice or service. For example, 3GPP TS 23.501, Release 15, section 5.7.4, shows mapping from a 5G QoS identifier (5QI) that maps CoS to QoS characteristics. For example, a 5QI value "1" corresponds to a set of QoS characteristics of 100 milliseconds (ms) packet delay budget, and a 2000 ms averaging window. Hard isolation means that all transport resources (including resources in all layers, packet resources, and/or optical resources) allocated for a virtual network connection (VNC) are dedicated for the VNC without sharing with another VNC. Soft isolation is generally the same as hard isolation except that optical resources may be shared with other VNCs. No isolation means that the VNC is permitted to share, with other VNCs, all transport resources.

An MTNC-ID is shared by the transport network, domains, and the 3GPP (or mobile network) domains on e.g., per (connection) path, class of service, and isolation basis. In the case that a connection path includes multiple transport segments across different domains (e.g., mobile network domains and transport domains), the same MTNC-ID is shared across the different domains. As shown in FIG. 4, an MTNC-ID "123" is used for the N3 segment, which includes the transport segment {L1}. An MTNC-ID "456" is used for the N9 segment, which includes the transport segments {L2}, {L3}, and {L4}. The MTNC-ID "456" is shared across the data center 410 (including the DC network 411), the backhaul network 440, and the DC network 421 in the data center 420. An MTNC-ID "789" is used for the N6 segment, which includes the transport segments {L5}, {L6}, and {L7}. The MTNC-ID "789" is shared across the data center 420 (including the DC network 421), the backhaul network 450, and the DC network 431 in the data center 430.

MTNC-IDs may be set up by estimating demand on each forwarding (or connection) path between two service end points. It is noted that the 3GPP connection segments (user plane segments), e.g., the N3 and N9 segments identified by GTP tunnel endpoint identifiers (TEIDs), only exist for the duration of a PDN session. It should also be noted that an MTNC-ID is not per user (or PDN) session, and the lifetime of the MTNC-ID is based on negotiation across TPMs and SDN-Cs for that connection path and context.

MTNC-IDs may be created and managed through negotiations between TPMs and SDN controllers. Each MTNC-ID is uniquely created for each connection path. A connection path may correspond to multiple MTNC-IDs each indicating a different set of resource provisioning requirements. The MTNC-IDs may then be bound to 3GPP data plane segments (e.g., GTP TEIDs). Details will be provided in the following for carrying the MTNC-IDs in the data plane so that transport entities on-path may provide the level of service guaranteed.

A mobile network may provision resources to handle QoS, compute, and storage based on a slice and a service selected by a user. The provisioned resources may correspond to a "service slice." For obtaining transport resources corresponding to the requirements of a service slice in the mobile network domain, it would be desirable to provide a means to request and provision these transport resources, and to carry policy binding information in data packets so that the transport domain may provide the right level of service according to the policy binding information. The policy binding information may include MTNC-IDs that need to be set up before being applied to the data packets.

Figure 5:
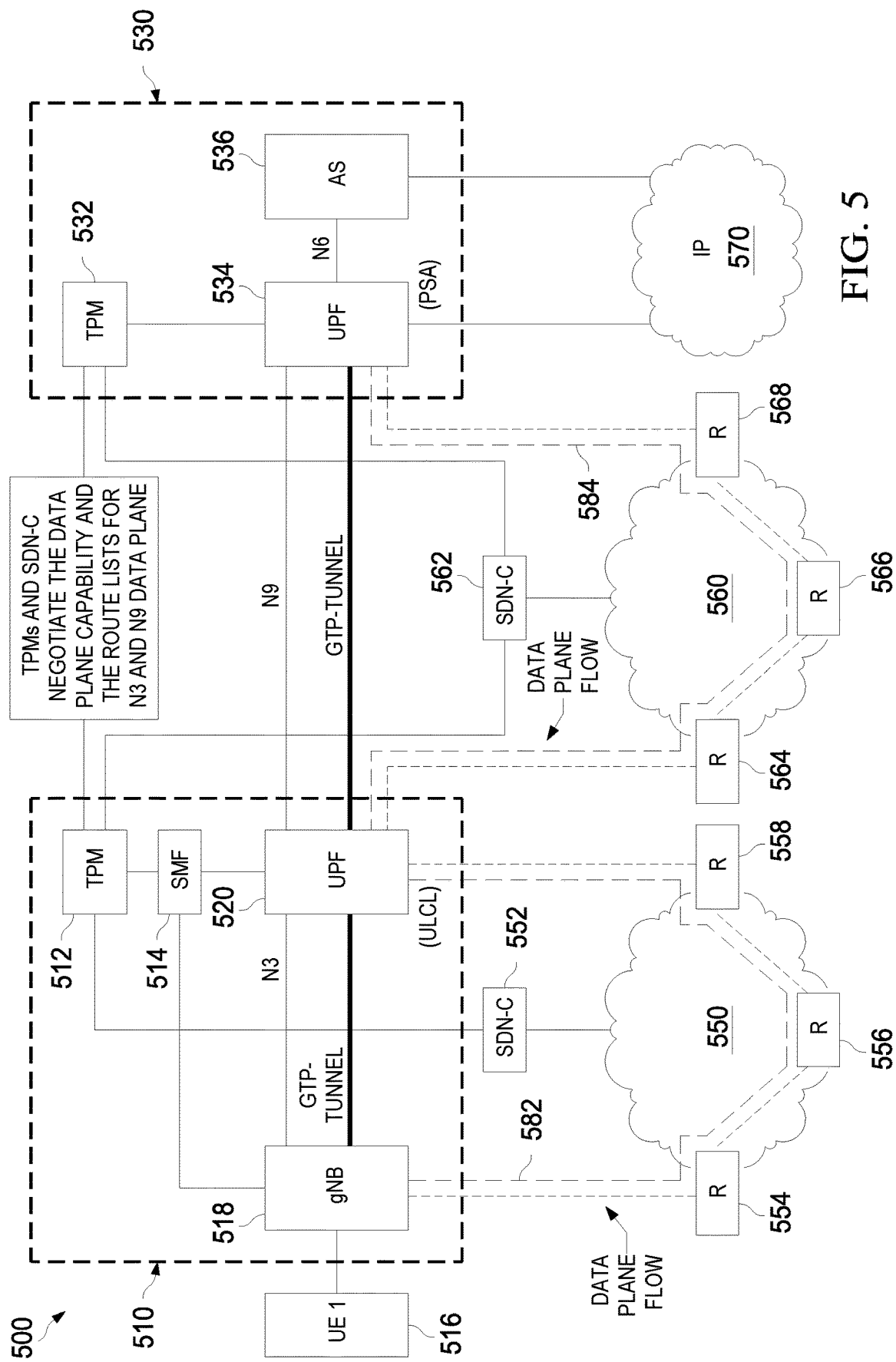
FIG. 5 is a diagram illustrating an embodiment of a communications system.

FIG. 5 is a diagram illustrating an embodiment of a communications system 500. FIG. 5 illustrates the negotiation of a transport context in the control plane components across TPMs and SDN-Cs. The negotiation binds the transport data plane technology and the associated route object such that a TPM may be able to enforce the corresponding transport context to subsequent control elements, such as a SMF and a UPF. Based on the transport context that is passed down to gNBs and UPFs, the gNBs and the UPFs may be able to add an MTNC-ID corresponding to the transport context to the data packets, which may be routed according to the transport context.

As shown, the communications system 500 includes a mobile network 510 and a mobile network 530 with traffic communicated between the two mobile networks 510 and 530. The mobile network 510 includes a TPM 512 and a SMF 514. The mobile network 530 includes a TPM 532. Traffic of a user session initiated by a UE 516 is transmitted to a gNB 518 in the mobile network 510, then forwarded to a UPF 520 of the mobile network 510, to a UPF 534 of the mobile network 530, and then to an AS 536 of the mobile network 530. The N3 segment between the gNB 518 and the UPF 520 traverses a transport network 550. The N9 segment between the UPFs 520 and 534 traverses a transport network 560. The N6 segment between the UPF 534 and the AS 536 traverses an IP network 570. The TPMs 512 and 532 and SDN-Cs 552 and 562 of the transport networks 550, 560, and 570 negotiate with each other for data plane capabilities and route lists for transporting traffic along the N3 and N9 segments in the data plane. When the user session is initiated, the SMF 514 may pass an MTNC-ID to the gNB 518, and the UPFs 520 and 534. The gNB 518 or the UPF 520 may add the MTNC-ID to the data packets received, and forward the packet to a transport network 550.

For data flow transmission, a GTP-tunnel is established between the gNB 518 and the UPF 520, and between the UPF 520 and the UPF 534. For the N3 segment, data flows in the data plane are transported in a path 582, i.e., from the gNB 518 to routers 554, 556 and 558 of the transport network 550, and then to the UPF 520. For the N9 segments, the data flows are transported in a path 584, i.e., from the UPF 520 to routers 564, 566 and 568 of the transport network 560, and then to the UPF 534.

Figure 6:
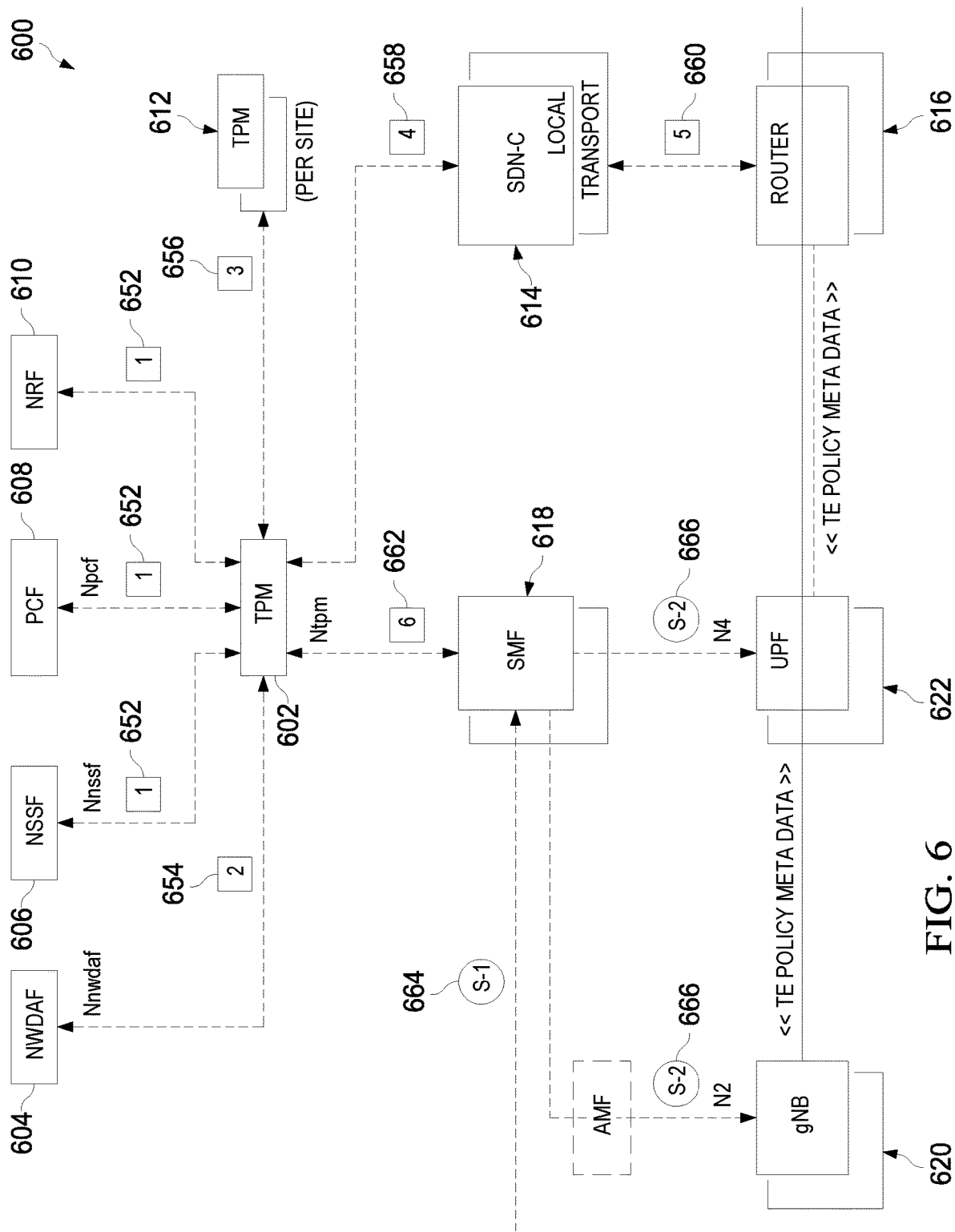
FIG. 6 is a diagram illustrating communications between control plane functions, highlighting a setup of MTNC-IDs in the control plane according to various embodiments of the disclosure.

FIG. 6 is a diagram 600 illustrating communications between control plane functions, highlighting a setup of MTNC-IDs in the control plane. FIG. 6 shows a TPM 602, a NWDAF 604, a network slice selection function (NSSF) 606, a PCF 608, a network resource function (NRF) 610, one or more TPMs 612, one or more SDN-Cs 614, one or more SMF 618, and one or more gNBs 620. The TPM 602, the NWDAF 604, the NSSF 606, the PCF 608, the NRF 610, and the one or more SMFs 618 belong to a first customer network (first site). Each of the TPMs 612 belongs to a second customer network (second site), where traffic may be transmitted between the first customer network and each of the second customer networks. Each of the SMFs 618 is configured to manage a set of UPFs 622. Each of the gNBs 620 provides access services to UEs in the first customer network.

Each of the SDN-Cs 614 belongs to a transport network, which may be a local transport network of a customer network, such as the DC network 411 of the data center 410 in FIG. 4, or a non-local transport network of a customer network, such as the backhaul network 440 in FIG. 4. Each SDN-C 614 manages multiple routers 616 within a corresponding transport network. As shown, traffic is transmitted from a gNB 620 to a UPF 622, which then forwards the traffic to a router 616.

In general, communications between the control plane functions includes determining a traffic matrix from end-to-end (E2E) (steps 652, 654 and 656), and negotiating transport resources and binding MTNC or tokens (steps 658, 660 and 662). When a mobile user session is created (step S-1 664), a network policy, and an MTNC-ID are installed in a UPF 622. When both the UPF 622 and the router 616 (from step 660) have the same binding information for the policy, resources along the transport path may be assigned accordingly.

The TPM 602 may obtain configuration information from databases. As shown, the TPM 602 may obtain information from the NSSF 606, the PCF 608, and the NRF 610 (step 652). The TPM 602 may obtain topology and configuration information about the first customer network from the NRF 610 and other configuration databases. The TPM 602 may subscribe or poll for slice and network policy information from the NSSF 606 and PCF 608. Information obtained here may be used in subsequent steps to derive information about connection paths and traffic matrix. Although FIG. 6 shows that the TPM 602 obtains the information from the NSSF 606, the PCF 608, and the NRF 610 at the same step 652, obtaining the information from the NSSF 606, the PCF 608, and the NRF 610 may be performed in different orders, at different time or the same time.

The TPM 602 may derive demand estimates. The TPM 602 may subscribe, from the NWDAF 604 (step 654) (and may also subscribe from a UPF 622, a SMF 618, or any other session and data path nodes), for data that may be used to calculate and estimate traffic on each connection path. The TPM 602 may also use historical data and other network policy information for deriving the estimates. The demand estimates may be used for negotiating bandwidth, latency, and other QoS provisioning with other TPMs, such as the TPM 612, for transmission from the first customer network to other customer networks.

The TPM 602 may negotiate traffic matrices with other TPMs 612 (step 656). The TPM 602 may use estimates derived at step 654 to agree across the networks on traffic estimates per connection path. During the communications with the other TPMs 612, the TPM 602 and a TPM 612 may additionally exchange MTNC-IDs (or tokens) assigned or determined end to end (E2E) per traffic class or CoS and connection path. An MTNC-ID (token) handling system may be provided for assigning unique MTNC-IDs per traffic class and connection path.

The TPM 602 may program MTNC-IDs at each SDN-C 614. The TPM 602 may send MTNC-IDs assigned/determined at step 656 to each SDN-C 614 on a connection path (corresponding to a 3GPP user plane segment, e.g., N3 or N9 segment) (step 658). The MTNC-IDs (and thus, the associated service class information, such as QoS requirements bandwidth, latency, etc., which is identified by the MTNC-IDs) are used by each SDN-C 614 in each transport domain to program the respective transport network for providing transport services according to the MTNC-IDs.

Each SDN-C 614 may program routers 616 managed by SDN-C 614 with the MTNC-IDs received from the TPM 602 (step 660). An SDN-C 614 may program a TE policy and parameters to routers on a TE transport path or segment and replies to the TPM 602 (step 658). If multiple SDN-Cs 614 are being programmed corresponding to an MTNC-ID, such as the SDN-Cs 412, 422 and 442 are programmed with the MTNC-ID "456" in FIG. 4, only after all SDN-Cs 614 accept the TE policy, does the TPM 602 commit the MTNC-ID.

Each SMF 618 may subscribe for the MTNC-IDs. A SMF 618 manages a set of UPFs 622 in the corresponding customer network. A SMF 618 may request the TPM 602 to provide MTNC-IDs for forwarding paths between each pair of UPFs 622 (corresponds to a 3GPP data plane segment) (step 662). If the SMF 618 has estimates for the forwarding path, it may provide information about the forwarding path to the TPM 602. The TPM 602 may respond with subscription and notification for each MTNC-ID (step 662), including CoS provided, slice information (for isolation), and/or load information. The TPM 602 may update the status of MTNC-IDs on a continual basis with notifications.

A SMF 618 may receive an incoming session request (step 664). When the SMF 618 receives a session establishment request initiated by a UE, it handles the request and checks information about the request, e.g., a network policy, QoS, and slice information of the request. The SMF 618 may then use the policy, QoS and slicing information to derive an MTNC-ID. The SMF 618 may determine the MTNC-ID from a list of MTNC-IDs received from the TPM 602.

The SMF 618 may configure the UPFs 622 with the derived MTNC-ID (step 666). In some embodiments, the MTNC-ID may be configured in the N4 UPF configuration procedure. The N4 UPF configuration parameters may remain the same as specified in the 3GPP TS 23.601, with the addition of the MTNC-ID, which is also configured to the UPFs 622. Each UPF 622 may include (or add, or insert) the MTNC-ID in each data packet of the user session, as will be further described below. Transport entities on-path, such as the routers 616, may inspect each data packet for an MTNC-ID, and grant resources or service levels in the transport network according to the MTNC-ID carried in each data packet. Similar configuration may also be made to a gNB 620 (through the N2 interface) for upstream packets over N3 interface. That is, the MTNC-ID may be configured for the gNB 620, which may add the MTNC-ID to each uplink data packet, as will be further described below.

An MTNC-ID is generated by a TPM 602 to be unique for each connection path and per class of service (including QoS requirements and slice). There may be more than one MTNC-ID for the same QoS requirements and connection path if there is a need to provide isolation (slice) of the traffic. MTNC-IDs are per class of service and connection path, and not per user session (nor is it per data path entity).

Since MTNC-IDs are unique, TPMs 602 and 612 at sites that correspond to both ends (service end points) of a connection path may negotiate values of the MTNC-IDs assigned. The MTNC-ID space may be partitioned in the mobile domain so as to avoid collisions. The consumed identifier space may be sparse, if, e.g., the MTNC-IDs are 16 bits or more. Thus, a simple partitioning scheme may be feasible. A formula for determining the number of permutations for "T" traffic classes (i.e., CoS) across "N" sites, with fully meshed, may be $(N*(N-1)/2)*T$. If there are multiple slices for the same QoS class that needs to be fully isolated, this will increase the number of MTNC-IDs assigned. For example, if there are 5 traffic classes between 16 sites, there are 600 MTNC-IDs that need to be set up and managed.

A TPM 602 creates unique MTNC-IDs per connection path (or forwarding path) and per set of resource provisioning requirements. For example, a TPM 602 at a site may create unique MTNC-IDs per QoS class, path and slice (for an E2E path, i.e., a connection path, between 2 sites with TPMs). If two TPMs 602 and 612 create MTNC-IDs for the same path and attempt to negotiate, the tie may be broken by selecting the one with a greater value (or by any method to resolve). This may be a part of determining the traffic matrix process between the TPMs 602, 612. The TPM 602 may then set up and provision QoS and slice with each SDN-C 614 on the E2E path. With the MTNC-IDs configured or created, the TPM 602 is ready to provision the MTNC-IDs to SMFs 618. Each SMF 618 that has subscribed to paths between sets of UPFs 622 are notified of the corresponding MTNC-IDs and their status. The TPM 602 may send different sets of MTNC-IDs to different SMFs 618 to manage load, lifetime, etc., of MTNC-IDs in a fine grained manner.

An SDN-C 614 of a transport network may obtain MTNC-IDs from a TPM 602 for setting up per path QoS in the transport network. It may provision routers 616 that it manages with the MTNC-IDs obtained and respond to the TPM 602. The SDN-C 614 may associate transport paths configured with the MTNC-IDs that it has received. There may also be a feedback mechanism between the SDN-C 614 and the TPM 602, where the SDN-C 614 constantly feeds back information about transport paths in the transport network configured according to the MTNC-IDs. The feedback information may include status of the transport paths, load, and other conditions or performance metrics of the transport paths per MTNC-ID.

Each SMF 618 of a customer network may send a subscription request to a TPM 602 of the customer network subscribing a list of MTNC-IDs for a set of UPFs 622 that it manages. A SMF 618 may send, along with the request, the set of UPFs 622 and additional information such as expected traffic (which may be derived based on historical patterns or an operator policy). The TPM 602 may acknowledge the request and notify the SMF 618 with a list of MTNC-IDs per connection path (e.g., UPF-UPF) and class of service (including QoS, slice). A SMF 618 may configure an MTNC-ID with a UPF 622 in the N4 session setup procedure that is specified in the 3GPP TS 23.602. For example, a SMF 618 may add the MTNC-ID in the parameters that are to be provided to the UPF 622 in the N4 session setup procedure according to the 3GPP TS 23.602, and send the all the parameters including the MTNC-ID to the UPF 622.

In the data plane, a gNB 620 or a UPF 622 may insert the MTNC-ID in each packet to be transmitted on a connection path (e.g., N3, or N9 segment). Routers 616 on a connection path may provide services based on the MTNC-ID carried in each data packet and as configured by respective SDN-Cs 614.

Figure 7:
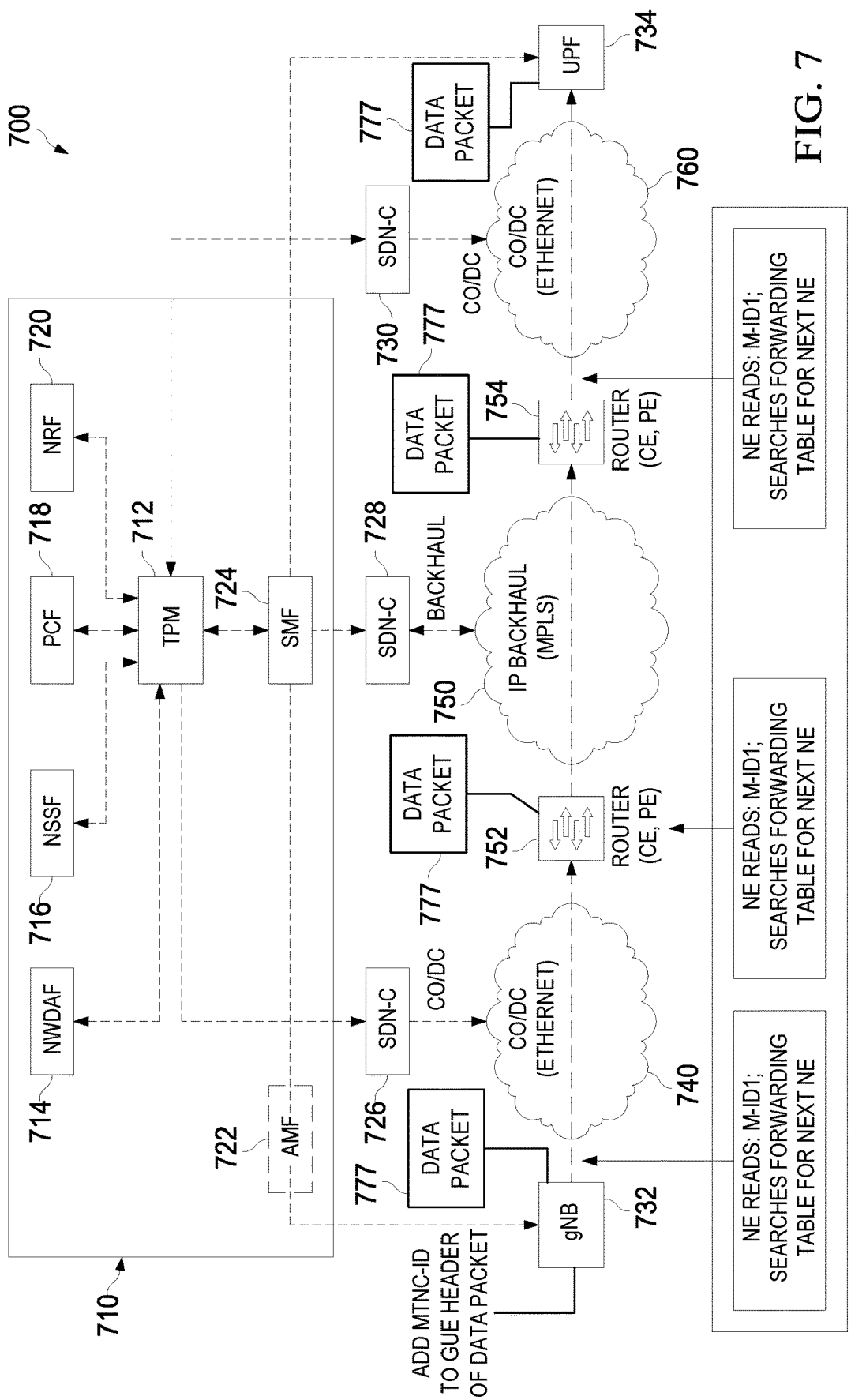
FIG. 7 is a diagram illustrating an embodiment of a communications system highlighting a configuration of MTNC-IDs across multiple transport networks.

FIG. 7 is a diagram illustrating an embodiment of a communications system 700 highlighting the configuration of MTNC-IDs across multiple transport networks. The communications system 700 includes a customer network 710. The customer network 710 includes control plane functions such as a TPM 712, a NWDAF 714, a NSSF 716, a PCF 718, a NRF 720, and an AMF 722. As discussed, the TPM 712 may collect data from one or more control plane functions for estimation of traffic demand, CoS, QoS requirements, and traffic matrices. The TPM 712 may provide a list of MTNC-IDs to a SMF 724 for paths between UPFs 734 (N9 interface) or between gNB 732 and UPF 734 (N3 interface), where each of the paths satisfies a provisioned set of QoS, CoS and isolation requirements. The TPM 712 also provisions MTNC-IDs to one or more SDN-Cs of transport networks, such as SDN-Cs 726, 728, and 730, on a connection path, according to which resources are provisioned to route traffic on the connection path. Multiple MTNC-IDs may be served by the same segment routes in a transport network. The transport network is responsible to provide services that are bound by the MTNC-IDs within the transport network.

A PDN connection may be initiated by a UE. The PDN connection, as shown in this example, includes two (may be more) transport slice segments, i.e., between the gNB 732 and a PE router 752, between PE routers 752 and 754, and between a PE Router 754 and the UPF 734. Based on the CoS, the QoS requirement, and the isolation requirement of the PDN connection, an MTNC-ID may be determined for the connection path between the gNB 732 and the UPF 734. As discussed above, an MTNC-ID may also be determined for a slice segment between two UPFs, or between a UPF and an application server (if the TPM and MTNC-ID mechanism is configured by the 3GPP service provider and the application server provider).

In this example, the connection path between the gNB 732 and the UPF 734 traverses three transport networks, i.e., a CO or DC 740 (which is an Ethernet), a IP backhaul 750, and a CO or DC 760 (which is also an Ethernet). Thus, the same MTNC-ID, i.e., "M-ID1" in this example, corresponding to the connection path between the gNB 732 and the UPF 734 may be provided to each of the SDN-Cs 726-730. Each of the SDN-Cs 726, 728 and 730 manages traffic routing for the PDN connection within the respective transport networks 740, 750 and 760 according to the "M-ID1". The "M-ID1" is thus used across multiple transport networks 740, 750, 760 on-path between the gNB 732 and the UPF 734.

In the control plane, the PDN connection setup is initiated by the UE, the SMF 724 provides the "M-ID1" to both the gNB 732 and the UPF 734. In the data plane, after receiving a data packet 777 from a UE, the gNB 732 adds the "M-ID1" to the data packet 777 received by the gNB 732 and forwards the data packet 777 to routers in the CO or DC 740. Data packets may carry meta data or the transport context indicating how the data packets should be routed by the routers. Currently, there are two approaches for carrying routing information, i.e., an explicit route list approach and an implicit route approach. In the explicit route list approach, meta data carried in data packets includes explicit route lists for each class of service. Explicit route lists may be used in cases where the control plane for routers may not be able to program the MTNC-IDs. Thus, the explicit route list approach may be used when it is necessary to limit changes to router control plane programming. In the implicit route approach, meta data carried in data packets may only include a MTNC-ID which is associated with a traffic class. The first router (or a subset of routers), e.g., an edge router, in each transport domain may inspect the MTNC-ID carried in each data packet and derive an explicit route list. Implicit routes may be used when there are multiple transport technologies (e.g., optical, multiprotocol label switching (MPLS), and Ethernet) used across a 3GPP transport segment, e.g., the N9 segment as shown in FIG. 4. The multiple transport technologies may include multiprotocol label switching (MPLS), segment routing (SR), SR over IP version 6 (IPv6) data plane (SRV6), Enhanced Virtual Private Network, layer 1 (optical transport network (OTN)), or layer 0 (wavelength division multiplexing (WDM)) optical data planes.

Disclosed herein are embodiments directed to carrying routing information based on the implicit route approach using a UDP header. In an embodiment, the MTNC-ID is carried in a GUE header of a data packet. For example, after receiving a data packet 777 from the UE, the gNB 732 encapsulates the data packet 777 by adding a UDP header and a GUE header to the data packet 777. In an embodiment, the MTNC-ID ("M-ID1") is added to a field of the GUE header. In an embodiment, the GUE header includes a "C" flag field, a proto/ctype field, and an "M" flag field. In one embodiment, the "C" flag field is set to indicate that the data packet 777 carries a data message, and the "M" flag field is set to indicate that the data packet 777 includes the MTNC-ID corresponding to the forwarding path along which the data packet 777 should be forwarded. In another embodiment, the "C" flag field is set to indicate that the data packet 777 includes a data message, and the proto/ctype field indicates that the data packet 777 includes the MTNC-ID.

In some cases, each of the three transport networks, i.e., CO or DC 740, an IP backhaul 750, and a CO or DC 760, may implement a different transport technology, such as, MPLS, SR, SRV6, layer 1 (OTN), layer o (WDM) optical data planes, IP version 4 (IPv4), or IPv6. The data packet 777 that is encapsulated to include the GUE header can be forwarded through the three transport networks 740, 750, 760 such that routers within the three transport networks 740, 750, 760 may process the data packet 777 regardless of the transport technology implemented by the transport network 740, 750, 760.

In these embodiments, routers within each of the three transport networks 740, 750, 760 first extract the MTNC-ID from the GUE header, determine a next router by which to forward the data packet 777 using a local forwarding table, and forward the data packet 777 to the next router. For example, after the gNB 732 encapsulates the data packet 777 to include the MTNC-ID of the data packet 777 in a GUE header of the data packet 777, the gNB 732 forwards the data packet 777 to a next hop (e.g., router in the CO or DC 740). The router then extracts the MTNC-ID from the GUE header of the data packet 777 and searches a local forwarding table to determine a next hop for the data packet 777 based on the MTNC-ID. Upon determining the next hop for the data packet 777, the router forwards the data packet 777 to the next hop as identified based on the MTNC-ID. As shown by FIG. 7, the data packet 777, including the MTNC-ID in the GUE header, is forwarded through the three transport networks 740, 750, 760 to the UPF 734 in a similar fashion.

Figure 8:
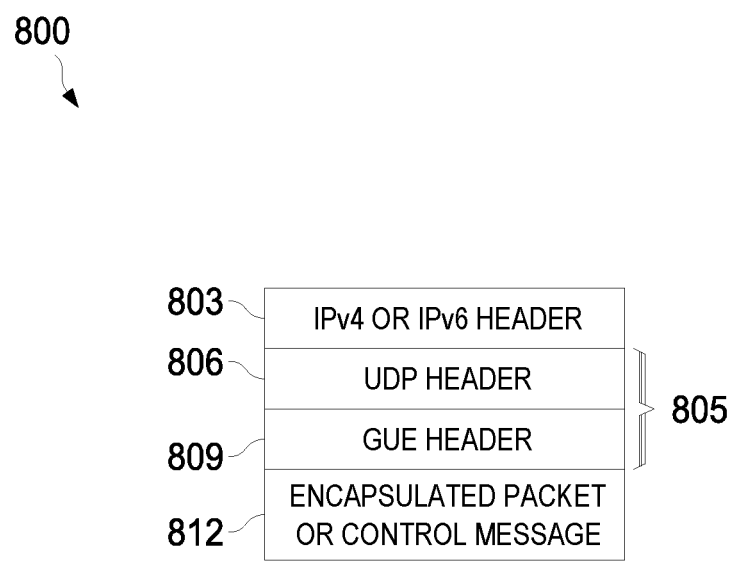
FIG. 8 is a diagram illustrating an example of a generic UDP encapsulation (GUE) packet configured to carry the MTNC-ID corresponding to a forwarding path along which to forward the data packet according to various embodiments of the disclosure.

FIG. 8 is a diagram illustrating an example of data packet 800, which is similar to data packet 777, and configured to carry the MTNC-ID, according to various embodiments of the disclosure. As shown by FIG. 8, the data packet 800 includes a standard IPv4 or IPv6 header 803, a UDP extension header 805, and an encapsulated packet or control message 812. The UDP extension header 805 includes a UDP header 806 and a GUE header 809.

The standard IPv4 or IPv6 header 803 may include an IPv4 header or an IPv6 header. An IPv4 header may be similar to the IPv4 header described by Internet Engineering Task Force (IETF) Request for Comments (RFC) 791 entitled "Internet Protocol," dated September 1981. An IPv6 header may be similar to an IPv6 header described by IETF RFC 8200 entitled "Internet Protocol, version 6 (IPv6) specification," dated July 2017. Both the IPv4 header and the IPv6 header include data used by NEs within a transport network to forward the data packet 800. For example, the IPv4 header and the IPv6 header both include fields to carry a source address and a destination address of the data packet 800. The UDP header 806 is similar to the UDP header described by IETF RFC 768 entitled "User Datagram Protocol," dated August 1980.

The GUE header 809 is a header encapsulated onto the data packet 800 with the UDP header 806 and used for transporting packets of different IP protocols across layer 3 networks. The GUE header 809 is variable length protocol header that is composed of a primary four byte header and zero or more four byte words of optional header data. The format of a GUE header 809 is similar to the GUE header described by the Internet Area Working Group draft document entitled "Generic UDP Encapsulation," by T. Herbet, et. al., dated Mar. 7, 2019 (hereinafter referred to as the "GUE Header Draft"). Examples of the GUE header 809 that are configured to carry the MTNC-ID are further described below with reference to FIGS. 9-11.

The encapsulated packet or control message 812 is the payload of the data packet 800. For example, the encapsulated packet or control message 812 may carry user data or a control message, such as an Operations, Administration, and Maintenance (OAM) message.

Figure 9:
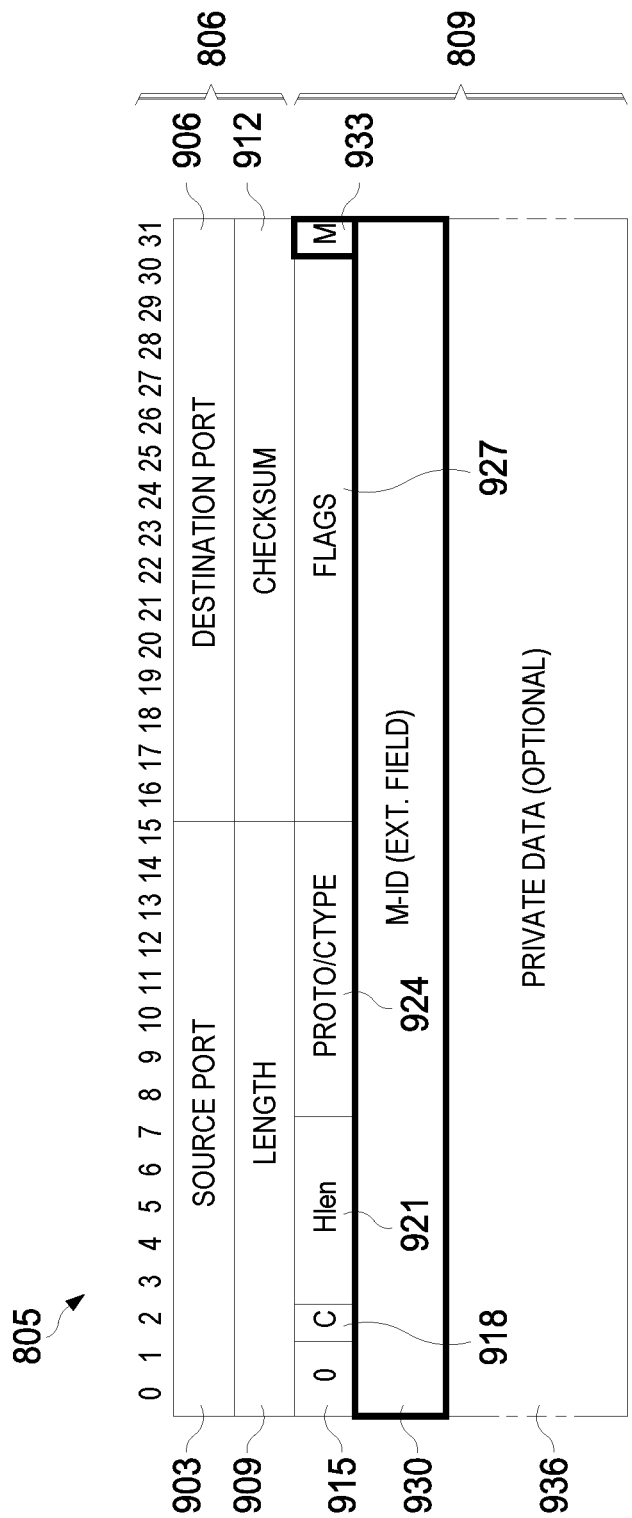
FIG. 9 is a diagram illustrating various fields within a UDP extension header of the data packet according to various embodiments of the disclosure.

FIG. 9 is a diagram illustrating various fields within a UDP extension header 805 of the data packet 800 according to various embodiments of the disclosure. Similar to the data packet 800 of the FIG. 8, the UDP extension header 805 of FIG. 9 includes the UDP header 806 and the GUE header 809.

The UDP header 806 includes a source port field 903, a destination port field 906, a length field 909, and a checksum field 912. The source port field 903 is set to indicate the local source port for a connection when connection semantics are applied to an encapsulation. The source port field 903 is set to a flow entropy value or a GUE assigned port number when connection semantics are not applied. The destination port field 906 is set to indicate the local destination port when connection semantics are applied to an encapsulation. The destination port field 906 is set to the GUE assigned port number when connection semantics are not applied. The length field 909 includes the canonical length of the data packet 800. The checksum field 912 includes a standard UDP checksum. The fields within the UDP header 806 are further described in the GUE Header Draft.

The GUE header 809 includes a "0" flag field 915, a "C" flag field 918, an Hlen field 921, a proto/ctype field 924, a flags field 927, an "M" flag field 933, an MTNC-ID field 930, and a private data field 936. The "0" flag field 915 indicates, when the "0" flag field 915 is set to 0, that the data packet 800 is encoded according to the GUE protocol version 0 with the GUE header 809. The "C" flag field 918 (also referred to as the "C-bit") includes a flag, or bit, indicating whether the data packet 800 carries a control message or a data message. When the "C" flag field 918 is set to 1, the data packet 800 carries a control message. When the "C" flag field 918 is not set (e.g., is set to 0), the data packet 800 carries a data message.

The Hlen field 921 carries a length of the GUE header 809 in 32 bit words, including optional extension fields but not the first four bytes of the GUE header 809. The proto/ctype field 924 carries a control message type for the payload included in the data packet 800 when the "C" flag field 918 is set to 1 (indicating that the data packet 800 carries a control message). In contrast, when the "C" flag field 918 is not set (indicating that the data packet 800 carries a data message), the proto/ctype field 924 carries the IP number for the encapsulated packet in the payload of the data packet 800.

The flags field 927 includes header flags that are allocated for various purposes and may indicate the presence of an extension field. In an embodiment, the flags field 927 of the GUE header 809 includes an "M" flag field 933 (also referred to as the "M flag" or "M bit"). In an embodiment, when the "C" flag field 918 is not set (indicating that the data packet 800 carries a data message), then the flags field 927 of the GUE header 809 includes an "M" flag field 933. The "M" flag field 933, when set, indicates that the GUE header 809, and thus the data packet 800, includes an MTNC-ID field 930. The MTNC-ID field 930 is an extension field of the GUE header 809 that carries the MTNC-ID associated with the data packet 800. As described above, the MTNC-ID corresponds to the forwarding path along which to forward the data path, in which the forwarding path is associated with a set of resource provisioning requirements for one or more transport networks on the forwarding path. Each router or switch on the forwarding path that receives the data packet 800 extracts the MTNC-ID from the MTNC-ID field 930 of the data packet 800 and provisions transport resources for traffic forwarding on the forwarding path based on the MTNC-ID.

In an embodiment in which the "C" flag field 918 is set to 1 (indicating that the data packet 800 carries a control message), the flags field 927 may not include the "M" flag field 933. Instead, the proto/ctype field 924 includes a value indicating that the GUE header 809, and thus the data packet 800, includes an MTNC-ID field 930, which is an extension field of the GUE header 809 that carries the MTNC-ID associated with the data packet 800.

Figure 10:
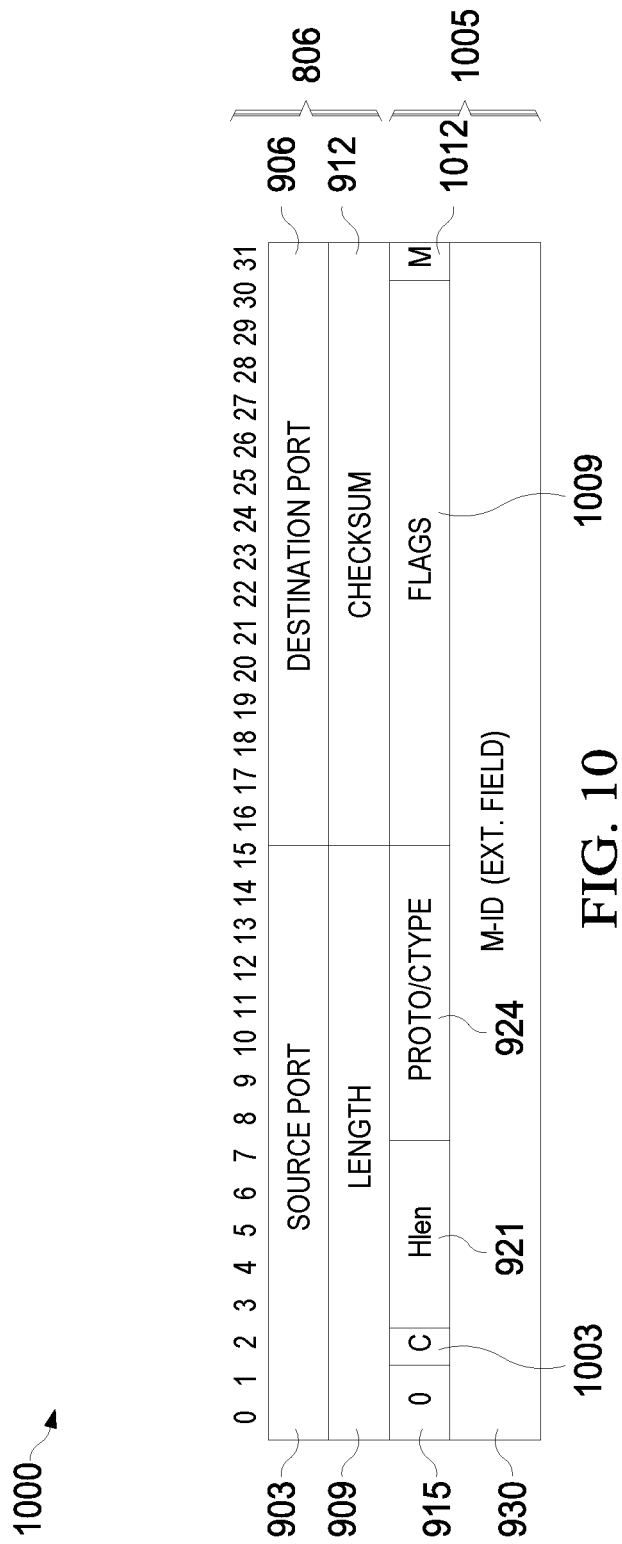
FIG. 10 is a diagram illustrating an example of a UDP extension header within the data packet according to various embodiments of the disclosure.

FIG. 10 is a diagram illustrating an example of a UDP extension header 1000 of the data packet 800 according to various embodiments of the disclosure. The UDP extension header 1000 is similar to the UDP extension header 805 described above with reference to FIG. 9. However, unlike the UDP extension header 805 of FIG. 9, the UDP extension header 1000 of FIG. 10 is included in a data packet 800 carrying a data message.

The UDP extension header 1000 includes a UDP header 806 and a GUE header 1005. The UDP header 806 of the UDP extension header 1000 of FIG. 10 includes fields similar to the UDP header 806 of the UPD extension header 900 of FIG. 9. In this way, the UDP header 806 of FIG. 10 includes the source port field 903, destination port field 906, length field 909, and checksum field 912, each of which is described above with reference to FIG. 9.

The GUE header 1005 includes the "0" flag field 915, "C" flag field 1003, Hlen field 921, proto/ctype field 924, flags field 1009, "M" flag field 1012, and MTNC-ID field 930. The "0" flag field 915, Hlen field 921, proto/ctype field 924, and MTNC-ID field 930 are similar to the fields in the GUE header 809 described above with reference to FIG. 9.

In the GUE header 1005, the "C" flag field 1003 is set to indicate that the data packet 800 including the UDP extension header 1000 carries a data message. For example, in this case, the "C" flag field 1003 is set to 1, which indicates that the data packet 800 including the UDP extension header 1000 carries a data message.

In this embodiment, when the "C" flag field 1003 is set to indicate that the data packet 800 including the UDP extension header 1000 carries a data message, the flags field 1009 includes an "M" flag field 1012. As described above, the "M" flag field 1012 contains a flag or bit indicating whether a MTNC-ID is carried in an extension field (e.g., in the MTNC-ID field 930) of the GUE header 1005.

Figure 11:
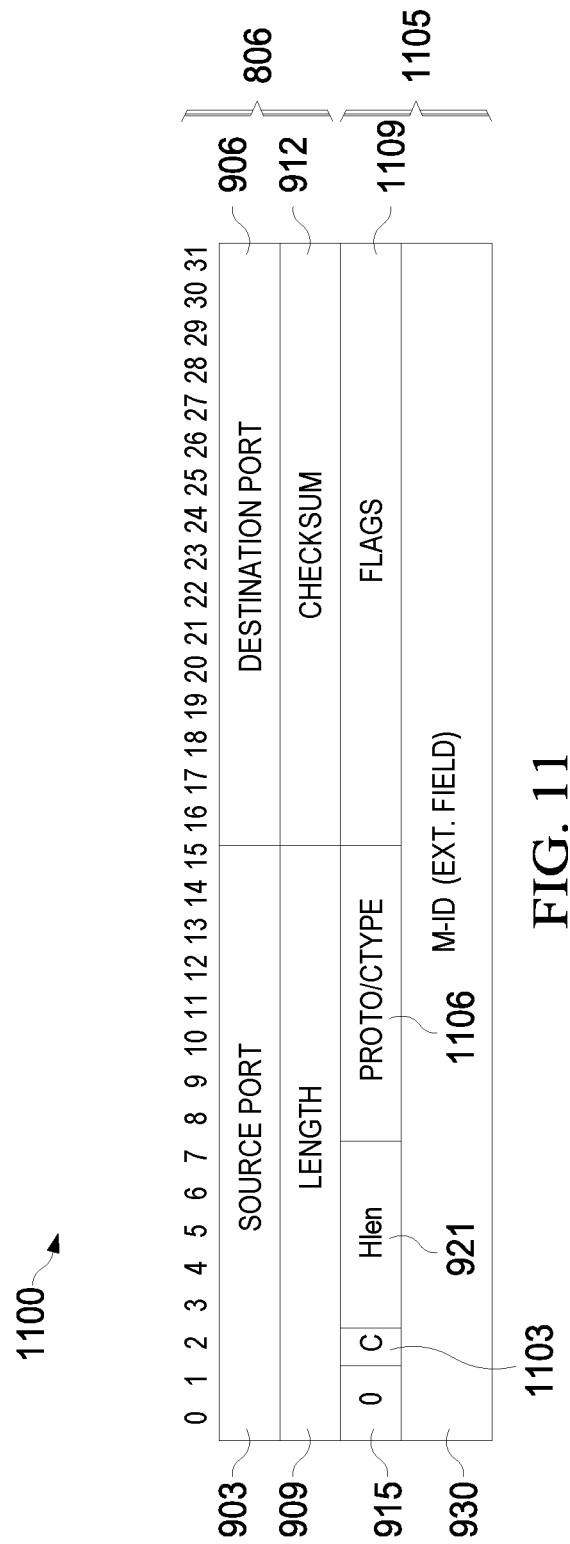
FIG. 11 is a diagram illustrating another example of a UDP extension header within the data packet according to various embodiments of the disclosure.

FIG. 11 is a diagram illustrating another example of a UDP extension header 1100 of the data packet 800 according to various embodiments of the disclosure. The UDP extension header 1100 is similar to the UDP extension header 805 described above with reference to FIG. 9. However, the UDP extension header 1100 of FIG. 11 is included in a data packet 800 carrying a control message.

The UDP extension header 1100 includes a UDP header 806 and a GUE header 1105. The UDP header 806 of the UDP extension header 1100 of FIG. 11 includes fields similar to the UDP header 806 of the UPD extension header 805 of FIG. 9. In this way, the UDP header 806 in FIG. 11 includes the source port field 903, destination port field 906, length field 909, and checksum field 912, each of which is described above with reference to FIG. 9.

The GUE header 1105 includes the "0" flag field 915, "C" flag field 1103, Hlen field 921, proto/ctype field 1106, flags 1109, and MTNC-ID field 930. The "0" flag field 915, Hlen field 921, and MTNC-ID field 930, are similar to the fields in the GUE header 806 described above with reference to FIG. 9.

In the GUE header 1005, the "C" flag field 1003 is set (or not set) to indicate that the data packet 800 including the UDP extension header 1100 carries a control message. For example, in this case, the "C" flag field 1003 is set to 0, which indicates that the data packet 800 including the UDP extension header 1100 carries a control message.

In this embodiment, when the "C" flag field 1003 is set to indicate that the data packet 800 including the UDP extension header 1100 carries a control message, the flags 1109 do not include an "M" flag field. Instead, the proto/ctype field 1106 carries a Ctype value indicating whether a MTNC-ID is carried in an extension field (e.g., in the MTNC-ID field 930) of the GUE header 1105.

Figure 12:
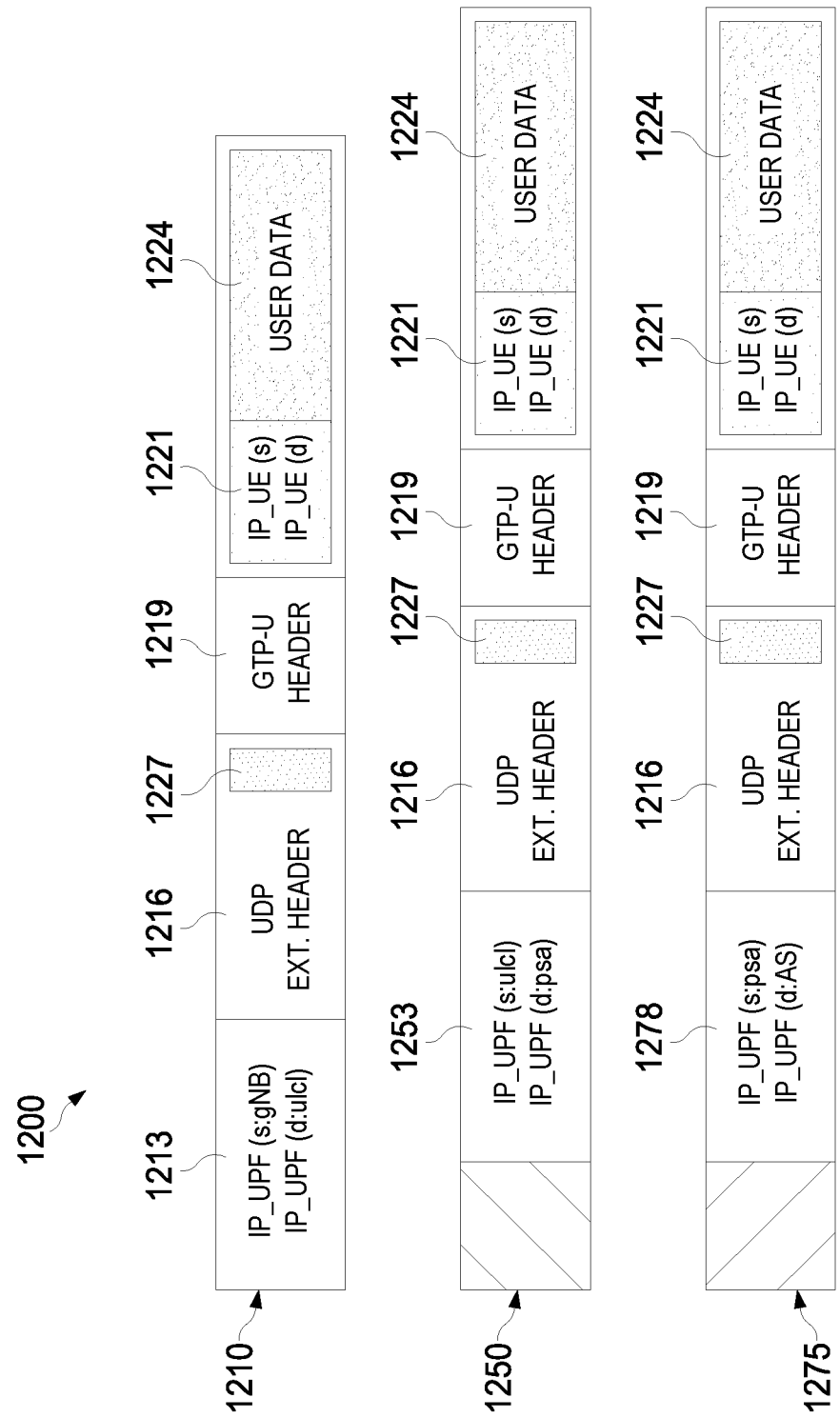
FIG. 12 is a diagram illustrating an encapsulation of a data packet across multiple domains of a communications system according to various embodiments of the disclosure.

As shown by FIGS. 11 and 12, data packets 800 are modified to include an extension header (e.g., MTNC-ID field 930) configured to carry an MNTC-ID associated with a forwarding path along which the data packet 800 should be forwarded. The data packet 800 includes an indicator signaling that the data packet 800 carries an MNTC-ID, in which the indicator is included in either the "M" flag field 1012 or the proto/ctype field 1106.

FIG. 12 is a diagram 1200 illustrating an encapsulation of data packets across a communications system, such as the communications system 700 of FIG. 7, according to various embodiments of the disclosure. In particular, diagram 1200 shows encapsulated data packets 1210, 1250, and 1275, which may be similar to the data packets 777 and 800.

The encapsulated data packet 1210 represents the data packet after encapsulation is performed by the gNB, such as the gNB 732 of the communications network 700. For example, when the gNB receives a data packet from an UE comprising user data 1224, the gNB encapsulates the data packet to include an inner IP header 1221, a GTP-user data tunnel (GTP-U) header 1219, the UDP extension header 1216, and an outer IP header 1213. In this way, at the gNB, the encapsulated data packet 1210 includes the outer IP header 1213, the UDP extension header 1216, the GTP-U header 1219, the inner IP header 1221, and the user data 1224.

The outer IP header 1213 may be an IPv6 header or an IPv4 header signaling the source and the destination for a first communication path (e.g., N3 segment) between the gNB and the first UPF on the forwarding path. For example, referring back to the communications system 500 of FIG. 5, the outer IP header 1213 may indicate that the source is the gNB 518 and that the destination is the UPF 520.

The UDP extension header 1216 may be similar to the UDP extension headers 805, 1000, or 1100 described above with reference to FIGS. 9, 10, and 11, respectively. As described above, the UDP extension header 1216 includes the UDP header and the GUE header, in which the GUE header carries the MTNC-ID 1227 associated with the forwarding path along which to forward the encapsulated data packet 1210.

The GTP-U header 1219 may be similar to the standard GTP-U header, as further described in the 3GPP TS 23.502 document. For example, the GTP-U header 1219 may include tunnel endpoint identifiers indicating endpoints of the communication path.

The inner IP header 1221 may be an IPv6 header or an IPv4 header signaling the end source and the end destination of the encapsulated data packet 1210. For example, the inner IP header 1221 may indicate the source as an address of the UE from which the user data 1224 originated, and the destination as an address of the destination toward which the encapsulated data packet 1210 is destined. The user data 1224 may be the payload of the encapsulated data packet 1210, including the user data 1224 received from the UE or source.

Referring now to the encapsulated data packet 1250, the encapsulated data packet 1250 represents the data packet being transported through the N9 segment. For example, referring back to the communications system 500 of FIG. 5, after the UPF 520 receives the encapsulated data packet 1210, and the UPF 520 decapsulates the encapsulated data packet 1210 by removing the outer IP header 1213 from the encapsulated data packet 1210. The UPF 520 adds a new outer IP header 1253 to the encapsulated data packet 1210 to create the encapsulated data packet 1250. The new outer IP header 1253 indicates the source and the destination for the next communication path (e.g., N9 segment) along the forwarding path to the destination. In this case, still referring to the communications system 500 of FIG. 5, the outer IP header 1253 may indicate that the source is the UPF 520 and that the destination is the UPF 534. Similar to the encapsulated data packet 1210, the encapsulated data packet 1250 includes the same UDP extension header 1216, GTP-U header 1219, inner IP header 1221, and user data 1224.

The encapsulated data packet 1275 represents the data packet being transported through the N6 segment. For example, referring back to the communications system 500 of FIG. 5, after the UPF 534 receives the encapsulated data packet 1250, and the UPF 534 decapsulates the encapsulated data packet 1250 by removing the outer IP header 1253 from the encapsulated data packet 1250. The UPF 534 adds a new outer IP header 1278 to the encapsulated data packet 1250 to create the encapsulated data packet 1275. The new outer IP header 1278 indicates the source and the destination for the next communication path (e.g., N6 segment) along the forwarding path to the destination. In this case, still referring to the communications system 500 of FIG. 5, the outer IP header 1278 may indicate that the source is the UPF 534 and that the destination is the AS 536. Similar to the encapsulated data packets 1210 and 1250, the encapsulated data packet 1275 includes the same UDP extension header 1216, GTP-U header 1219, inner IP header 1221, and user data 1224.

As shown by FIG. 12, as a data packet passes through multiple domains (e.g., transport networks) of a communications system, only the outer IP headers 1213, 1253, and 1278, which indicate the source and destination of the communications paths (e.g., N3, N6, and N9 segments) along which the data packet is forwarded, change. The UDP extension header 1216, GTP-U header 1219, inner IP header 1221, and user data 1224 remain the same in the data packet as the data packet passes through multiple domains of a communications system. In this way, the MTNC-ID 1227 is carried in UDP extension header 1216 of the data packet as the data packet passes through multiple domains of a communications system, regardless of the transport technology implemented by each domain.

Figure 13:
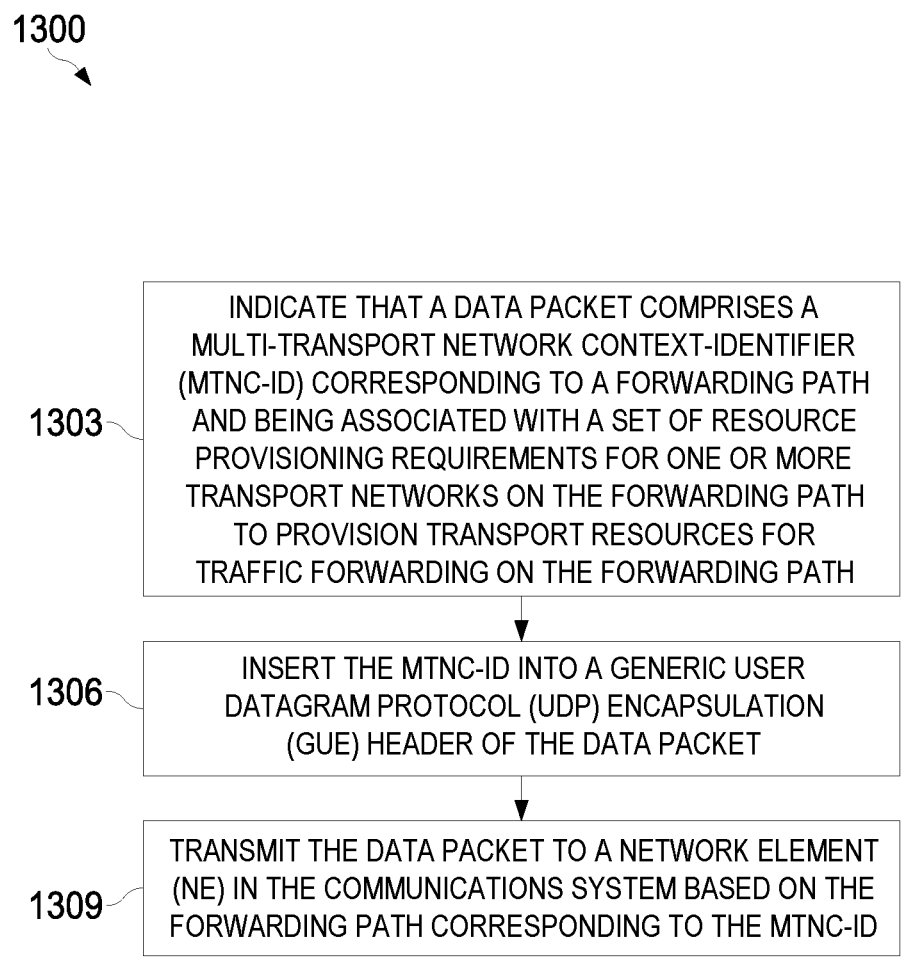
FIG. 13 is a flowchart illustrating a method of transporting MTNC-IDs across multiple domains according to various embodiments of the disclosure.

FIG. 13 is a flowchart illustrating a method 1300 of transporting MTNC-IDs across multiple domains (e.g., transport networks) according to various embodiments of the disclosure. Method 1300 may be implemented by a gNB (e.g., gNB 518) within a communications system (e.g., communications system 500). Method 1300 may be implemented after the NEs (e.g., nodes) in the communications system 500 have programmed the MTNC-IDs assigned by the TPM. For example, the NEs within the transport networks of the communications system maintain a forwarding table that stores the MTNC-IDs and the corresponding forwarding paths associated with the MTNC-ID. In this way, each NE may obtain a next NE along which to forward a data packet including a particular MTNC-ID. Method 1300 may also be implemented after the gNB receives a data packet from a UE.

At step 1303, the gNB indicates that a data packet comprises a MTNC-ID. For example, the gNB may encapsulate the data packet to include the UDP extension header 1000 or the UDP extension header 1100. In an embodiment, the MTNC-ID corresponds to a forwarding path and is associated with a set of resource provisioning requirements for one or more transport networks on the forwarding path to provision transport resources for traffic forwarding on the forwarding path.

At step 1306, the gNB inserts the MTNC-ID into the GUE header of the data packet. For example, after receiving the data packet 800 from a UE and encapsulating the data packet 800 to include a UDP header 806 and a GUE header 809, the gNB inserts the MTNC-ID into the MTNC-ID field 930 of the GUE header 809 of the data packet 800.

At step 1309, the data packet is transmitted to a NE in the communications system based on the forwarding path corresponding to the MTNC-ID. For example, the gNB searches a local forwarding table to determine the forwarding path, and thus the next hop, by which to forward the data packet based on the MTNC-ID carried in the GUE header. The gNB forwards the data packet to the next hop, or the NE, in the communications system identified using the forwarding table.

Figure 14:
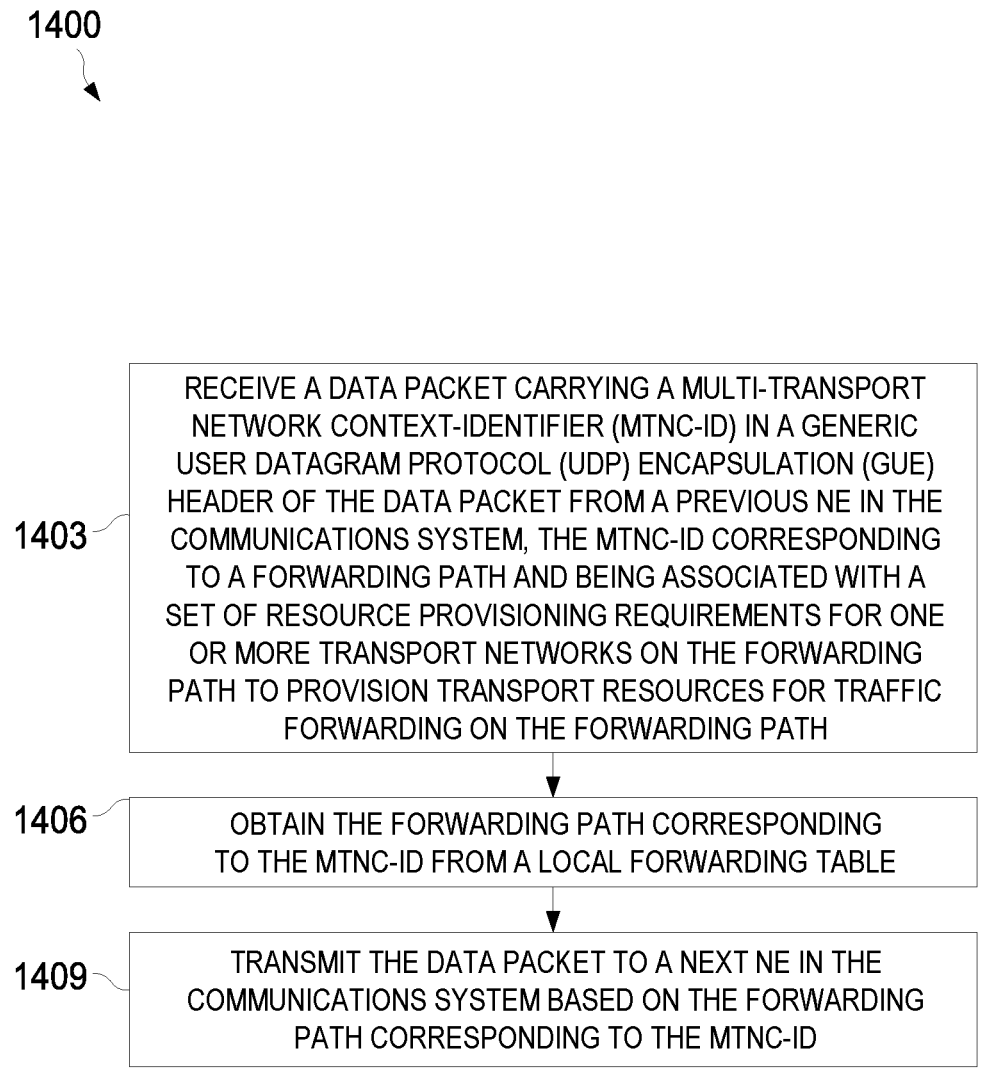
FIG. 14 is a flowchart illustrating another method of transporting MTNC-IDs across multiple domains according to various embodiments of the disclosure.

FIG. 14 is a flowchart illustrating another method 1400 of transporting MTNC-IDs across multiple domains (e.g., transport networks) according to various embodiments of the disclosure. Method 1400 may be implemented by an intermediate NE in the communications system. For example, in the communications system 500 of FIG. 5, the method 1400 may be implemented by the routers 554, 556, 558, 564, 566, or 568. In the communications system 500 of FIG. 5, the method 1400 may also be implemented by the UPFs 520 or 534 or the AS 536. Method 1400 may be implemented after the NEs (e.g., routers 554, 556, 558, 564, 566, and 568, UPFs 520 and 534, and the AS 536) in the communications system 500 have programmed the MTNC-IDs assigned by the TPM. Method 1400 may also be implemented after the gNB receives a data packet from a UE, and forwards the data packet along the forwarding path identified by the MTNC-ID.

At step 1403, the NE receives a data packet carrying a MTNC-ID in a GUE header of the data packet from a previous NE (e.g., prior hop, upstream node, etc.) in the communications system. For example, the data packet was previously encapsulated to include the UDP extension header 1000 or the UDP extension header 1100, and the MTNC-ID is carried in a field of the GUE header. In an embodiment, the MTNC-ID corresponds to a forwarding path and is associated with a set of resource provisioning requirements for one or more transport networks on the forwarding path to provision transport resources for traffic forwarding on the forwarding path.

At step 1406, the NE obtains the forwarding path corresponding to the MTNC-ID from a local forwarding table. For example, each NE in the communications system that receives the MTNC-ID stores the MTNC-ID and details of the forwarding path in a local forwarding table. The forwarding table also stores the set of resource provisioning requirements for one or more transport networks on the forwarding path such that the NE is configured to provision transport resources for traffic forwarding on the forwarding path. By searching the local forwarding table, the NE is able to obtain the forwarding path corresponding to the MTNC-ID.

At step 1409, the NE transmits the data packet to a next NE (e.g., next hop, downstream node, etc.) on the forwarding path based on the MTNC-ID. After the NE searches the forwarding table to obtain a next hop identified by the MTNC-ID, the NE forwards the data packet to the next hop (e.g., next NE) on the forwarding path.

Figure 15:
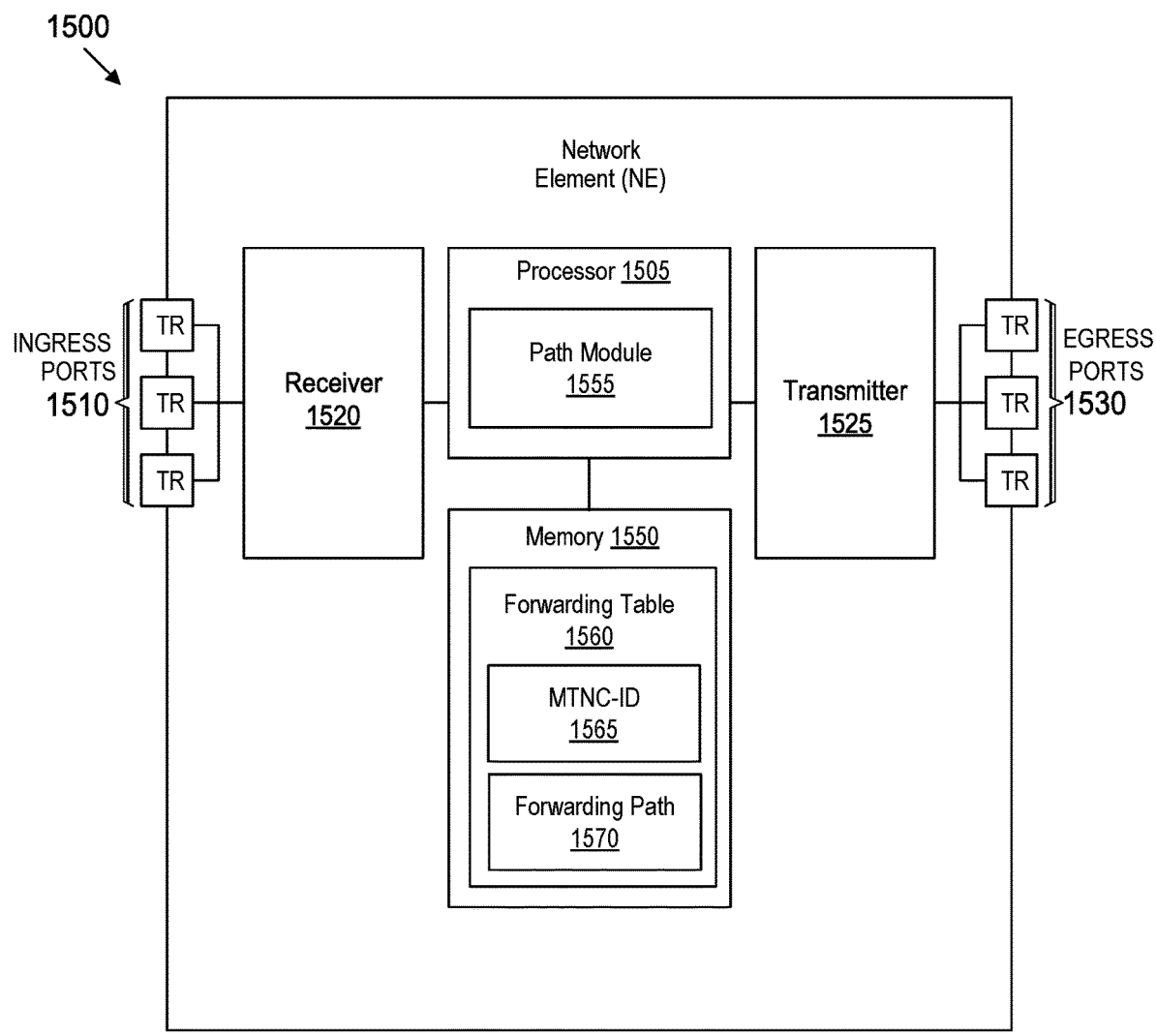
FIG. 15 is a diagram of a NE configured to transport MTNC-IDs across multiple domains according to various embodiments of the disclosure.

FIG. 15 is a diagram of an embodiment of a network element (NE) 1500 in the network 100. For instance, the NE 1500 may be similar to the routers 554, 556, 558, 564, 566, and 568, UPFs 520 and 534, and the AS 536 in the communications system 500 of FIG. 5. The NE 1500 may be configured to implement and/or support the methods transporting MTNC-IDs across multiple domains (e.g., transport networks) described herein. The NE 1500 may be implemented in a single node or the functionality of NE 1500 may be implemented in a plurality of nodes. One skilled in the art will recognize that the term NE encompasses a broad range of devices of which NE 1500 is merely an example. The NE 1500 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 1500. For instance, the features and/or methods in the disclosure may be implemented using hardware, firmware, and/or software installed to run on hardware. As shown in FIG. 15, the NE 1500 comprises one or more ingress ports 1510 and a receiver unit (Rx) 1520 for receiving data, at least one processor, logic unit, or central processing unit (CPU) 1505 to process the data, a transmitter unit (Tx) 1525 and one or more egress ports 1530 for transmitting the data, and a memory 1550 for storing the data.

The processor 1505 may comprise one or more multi-core processors and be coupled to a memory 1550, which may function as data stores, buffers, etc. The processor 1505 may be implemented as a general processor or may be part of one or more application specific integrated circuits (ASICs) and/or digital signal processors (DSPs). The processor 1505 may comprise a path module 1555, which may perform methods 1300 and 1400 discussed above. As such, the inclusion of the path module 1555 and associated methods and systems provide improvements to the functionality of the NE 1500. Further, the path module 1555 effects a transformation of a particular article (e.g., the network) to a different state. In an alternative embodiment, path module 1555 may be implemented as instructions stored in the memory 1550, which may be executed by the processor 1505.

The memory 1550 may comprise a cache for temporarily storing content, e.g., a random-access memory (RAM). Additionally, the memory 1550 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 1550 may be configured to the forwarding table 1560, which stores mappings between the MTNC-IDs 1565 and the forwarding paths 1570. In this way, the forwarding table 1560 indicates the next hop (e.g., next NE) on a forwarding path by which to forwarding a data packet carrying the MTNC-ID 1565 in a GUE header.

It is understood that by programming and/or loading executable instructions onto the NE 1500, at least one of the processor 1505 and/or memory 1550 are changed, transforming the NE 1500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 16:
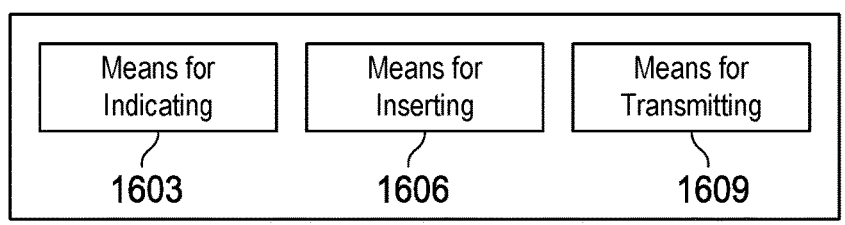
FIG. 16 is a diagram of an apparatus configured to transport MTNC-IDs across multiple domains according to various embodiments of the disclosure.

FIG. 16 is a diagram of an apparatus 1600 configured to transport MTNC-IDs across multiple domains according to various embodiments of the disclosure. The apparatus 1600 comprises a means for indicating 1603 that a data packet comprises a MTNC-ID corresponding to a forwarding path and being associated with a set of resource provisioning requirements for one or more transport networks on the forwarding path to provision transport resources for traffic forwarding on the forwarding path, a means for inserting 1606 the MTNC-ID into a GUE header of the data packet, and a means for transmitting 1609 the data packet to a NE in the communications system based on the forwarding path corresponding to the MTNC-ID.

Figure 17:
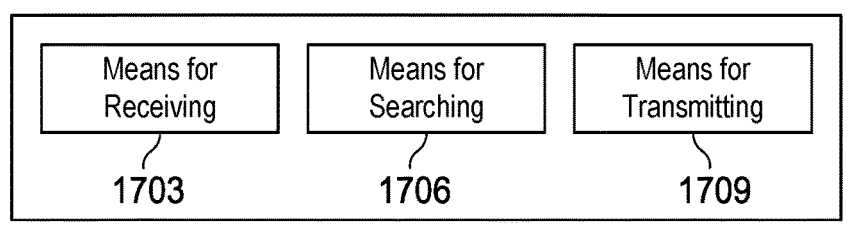
FIG. 17 is a diagram of another apparatus configured to transport MTNC-IDs across multiple domains according to various embodiments of the disclosure.

FIG. 17 is a diagram of an apparatus 1700 configured to transport MTNC-IDs across multiple domains according to various embodiments of the disclosure. The apparatus 1700 comprises a means for receiving 1703 a data packet carrying a MTNC-ID in a GUE header of the data packet from a previous NE in the communications system, the MTNC-ID corresponding to a forwarding path and being associated with a set of resource provisioning requirements for one or more transport networks on the forwarding path to provision transport resources for traffic forwarding on the forwarding, a means for searching 1706 a local forwarding table for the forwarding path corresponding to the MTNC-ID, and a means for transmitting 1709 the data packet to a next NE on the forwarding path based on the MTNC-ID.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a Next Generation Node B (gNB) in a communications system implementing User Datagram Protocol (UDP), comprising:
   encapsulating a data packet to include a UDP header and a Generic UDP Encapsulation (GUE) header, with the GUE header comprising a first field and a multi-transport network context-identifier (MTNC-ID) field;
   providing, in the first field of the GUE header, an indication that the data packet comprises a MTNC-ID corresponding to a forwarding path and being associated with a set of resource provisioning requirements for one or more transport networks on the forwarding path to provision transport resources for traffic forwarding on the forwarding path;
   inserting the MTNC-ID into the MTNC-ID field of the GUE header; and
   transmitting the data packet with the UDP header and the GUE header to a network element (NE) in the communications system based on the forwarding path corresponding to the MTNC-ID.

2. The method of claim 1, wherein the set of resource provisioning requirements comprises a quality of service (QoS) requirement, a class of service (CoS) requirement, a resilience requirement, and an isolation requirement.

3. The method of claim 1, wherein each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

4. The method of claim 1, further comprising storing a forwarding table comprising a mapping between the MTNC-ID and the forwarding path.

5. The method of claim 1, further comprising providing, in a "C" flag field of the GUE header, a second indication that the data packet carries a data message, and wherein the first field is a "M" flag field comprising a value indicating that the data packet comprises the MTNC-ID.

6. The method of claim 1, wherein the GUE header comprises a "C" flag field set to indicate that the data packet carries a control message, and wherein the first field is a proto/ctype field comprising a value indicating that the data packet comprises the MTNC-ID.

7. The method of claim 1, further comprising encapsulating the data packet to further comprise an outer Internet Protocol (IP) header, a UDP extension header, a General Packet Radio Service Tunneling Protocol (GTP)-User Data Tunneling (GTP-U) header, and an inner IP header, wherein the UDP extension header comprises the UDP header and the GUE header carrying the MTNC-ID.

8. A method performed by a network element (NE) in a communications system implementing User Datagram Protocol (UDP), comprising:
   receiving, from a previous NE in the communications system, a data packet including a UDP header and a Generic UDP Encapsulation (GUE) header, with the GUE header comprising a first field and a multi-transport network context-identifier (MTNC-ID) field, the first field in the GUE header indicating that the data packet comprises a MTNC-ID corresponding to a forwarding path and being associated with a set of resource provisioning requirements for one or more transport networks on the forwarding path to provision transport resources for traffic forwarding on the forwarding path, and the MTNC-ID field in the GUE header carrying the MTNC-ID of the data packet;
   obtaining the forwarding path corresponding to the MTNC-ID from a local forwarding table; and
   transmitting the data packet with the UDP header and the GUE header to a next NE in the communications system based on the forwarding path corresponding to the MTNC-ID.

9. The method of claim 8, wherein the set of resource provisioning requirements comprises a quality of service (QoS) requirement, a class of service (CoS) requirement, a resilience requirement, and an isolation requirement.

10. The method of claim 8, wherein each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

11. The method of claim 8, wherein the GUE header comprises a "C" flag field set to indicate that the data packet carries a data message, and wherein the first field is an "M" flag field comprising a value indicating that the data packet comprises the MTNC-ID.

12. The method of claim 8, wherein the GUE header comprises a "C" flag field set to indicate that the data packet carries a control message, and wherein the first field is a proto/ctype field comprising a value indicating that the data packet comprises the MTNC-ID.

13. The method of claim 8, wherein the data packet comprises an outer Internet Protocol (IP) header, a UDP extension header, a General Packet Radio Service Tunneling Protocol (GTP)-User Data Tunneling (GTP-U) header, and an inner IP header, wherein the UDP extension header comprises the UDP header and the GUE header carrying the MTNC-ID.

14. A Next Generation Node B (gNB) implemented in a communications system, comprising:
   a memory having stored computer instructions; and
   a processor coupled to the memory to retrieve and execute the computer instructions from the memory to prompt the gNB to:
      encapsulate a data packet to include a User Datagram Protocol (UDP) header and a Generic UDP Encapsulation (GUE) header, with the GUE header comprising a first field and a multi-transport network context-identifier (MTNC-ID) field;
      provide, in the first field of the GUE header, an indication that the data packet comprises a MTNC-ID corresponding to a forwarding path and being associated with a set of resource provisioning requirements for one or more transport networks on the forwarding path to provision transport resources for traffic forwarding on the forwarding path;
      insert the MTNC-ID into the MTNC-ID field of the GUE header; and
      transmit the data packet with the UDP header and the GUE header to a network element (NE) in the communications system based on the forwarding path corresponding to the MTNC-ID.

15. The gNB of claim 14, wherein the set of resource provisioning requirements comprises a quality of service (QoS) requirement, a class of service (CoS) requirement, a resilience requirement, and an isolation requirement.

16. The gNB of claim 14, wherein each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

17. The gNB of claim 14, wherein the instructions further prompt the gNB to store a forwarding table comprising a mapping between the MTNC-ID and the forwarding path.

18. The gNB of claim 14, wherein the GUE header comprises a "C" flag field set to indicate that the data packet carries a data message, and wherein the first field is an "M" flag field comprising a value indicating that the data packet comprises the MTNC-ID.

19. The gNB of claim 14, wherein the GUE header comprises a "C" flag field set to indicate that the data packet carries a control message, and wherein the first field is a proto/ctype field comprising a value indicating that the data packet comprises the MTNC-ID.

20. The gNB of claim 14, wherein the gNB further retrieves and executes the computer instructions from the memory to encapsulate the data packet to further comprise an outer Internet Protocol (IP) header, a UDP extension header, a General Packet Radio Service Tunneling Protocol (GTP)-User Data Tunneling (GTP-U) header, and an inner IP header, wherein the UDP extension header comprises the UDP header and the GUE header carrying the MTNC-ID.

21. A network element (NE) implemented in a communications system, comprising:
a memory having stored computer instructions; and
a processor coupled to the memory to retrieve and execute the computer instructions from the memory to perform:
receive, from a previous NE in the communications system, a data packet including a User Datagram Protocol (UDP) header and a Generic UDP Encapsulation (GUE) header, with the GUE header comprising a first field and a multi-transport network context-identifier (MTNC-ID) field, the first field in the GUE header indicating that the data packet comprises a MTNC-ID corresponding to a forwarding path and being associated with a set of resource provisioning requirements for one or more transport networks on the forwarding path to provision transport resources for traffic forwarding on the forwarding path, and the MTNC-ID field in the GUE header carrying the MTNC-ID of the data packet;
obtain the forwarding path corresponding to the MTNC-ID from a local forwarding table; and
transmit the data packet with the UDP header and the GUE header to a next NE in the communications system based on the forwarding path corresponding to the MTNC-ID.

22. The NE of claim 21, wherein the set of resource provisioning requirements comprises a quality of service (QoS) requirement, a class of service (CoS) requirement, a resilience requirement, and an isolation requirement.

23. The NE of claim 21, wherein each of the one or more transport networks comprises NEs configured to implement at least one of Multiprotocol Label Switching (MPLS), Segment Routing over Internet Protocol (IP) version 6 (IPv6) data plane (SRv6), IP transport, or Enhanced Virtual Private Network.

24. The NE of claim 21, wherein the GUE header comprises a "C" flag field set to indicate that the data packet carries a data message, and wherein the first field is an "M" flag field comprising a value indicating that the data packet comprises the MTNC-ID.

25. The NE of claim 21, wherein the GUE header comprises a "C" flag field set to indicate that the data packet carries a control message, and wherein the first field is a proto/ctype field comprising a value indicating that the data packet comprises the MTNC-ID, and wherein the MTNC-ID field carries the MTNC-ID.

26. The NE of claim 21, wherein the data packet comprises an outer Internet Protocol (IP) header, a UDP extension header, a General Packet Radio Service Tunneling Protocol (GTP)-User Data Tunneling (GTP-U) header, and an inner IP header, wherein the UDP extension header comprises the UDP header and the GUE header carrying the MTNC-ID.

* * * * *